United States Patent
Alshayeb et al.

(10) Patent No.: US 10,481,906 B2
(45) Date of Patent: Nov. 19, 2019

(54) REFACTORING TO IMPROVE THE SECURITY QUALITY OF USE CASE MODELS

(71) Applicant: KING FAHD UNIVERSITY OF PETROLEUM AND MINERALS, Dhahran (SA)

(72) Inventors: Mohammad Alshayeb, Dhahran (SA); Mahmood Niazi, Dhahran (SA); Haris Mumtaz, Dhahran (SA); Sajjad Mahmood, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 273 days.

(21) Appl. No.: 15/793,271

(22) Filed: Oct. 25, 2017

(65) Prior Publication Data
US 2019/0121635 A1    Apr. 25, 2019

(51) Int. Cl.
G06F 21/00 (2013.01)
G06F 8/72 (2018.01)
G06F 21/31 (2013.01)
G06F 8/77 (2018.01)
G06F 8/10 (2018.01)
(Continued)

(52) U.S. Cl.
CPC .................. *G06F 8/72* (2013.01); *G06F 8/10* (2013.01); *G06F 8/77* (2013.01); *G06F 21/31* (2013.01); *G06F 21/44* (2013.01); *G06F 21/604* (2013.01)

(58) Field of Classification Search
CPC ... G06F 21/44; G06F 8/10; G06F 8/72; G06F 8/77; G06F 8/20; G06F 8/24; G06F 11/36; G06F 11/3604; G06F 11/362; G06F 11/3668
See application file for complete search history.

(56) References Cited

U.S. PATENT DOCUMENTS

2015/0100942 A1    4/2015 Misbahuddin et al.
2017/0091462 A1*   3/2017 Kurauchi .................. G06F 8/20

FOREIGN PATENT DOCUMENTS

IN    20140048812    8/2016

OTHER PUBLICATIONS

Rui et al. 2003, Refactoring Use Case Models: The Metamodel, Department of Computer Science Condordia University (Year: 2003).*
Emden et al. 2002, Java Quality Assurance by Detecting Code Smells, CWI, The Netherlands (Year: 2002).*

(Continued)

*Primary Examiner* — Jason K Gee
*Assistant Examiner* — Ka Shan Choy
(74) *Attorney, Agent, or Firm* — Oblon, McClelland, Maier & Neustadt, L.L.P.

(57) ABSTRACT

Methods and devices for improving security of a use case model are described. In accordance with the present disclosure, detection rules are applied to the use case model to detect bad smells. The use case model into an XML representation. The XML representation is refactored using the security bad smells to generate a refactored XML representation of the use case model. A behavior consistency verification processing is performed by processing the refactored use case models. Quality metrics of the refactored XML representation are generated before and after the refactoring. The quality metrics are compared to generate a quality improvement assessment of security for the use case model.

20 Claims, 14 Drawing Sheets

(51) Int. Cl.
    *G06F 21/60*      (2013.01)
    *G06F 21/44*      (2013.01)

(56)　　　　　References Cited

OTHER PUBLICATIONS

Griffith, Isaac, et al., "TrueRefactor: an automated refactoring tool to improve legacy system and application comprehensibility". Computer Science Department, Montana State University, Jan. 2011, pp. 1-6.
Pandiyavathi, T., et al., "Sequential ordering of code smells and usage of heuristic algorithm", Indian Journal of Science and Technology, vol. 8, Issue 2, Jan. 2015, pp. 23-28.
Liu, Hui, et al., "Dynamic and automatic feedback-based threshold adaptation for code smell detection", IEEE Transactions on Software Engineering, vol. 42. Issue 6, Jun. 2016, pp. 544-558.
Kebir, Salim, et al., "A genetic algorithm-based approach for automated refactoring of component-based software", Journal of Information and Software Technology, vol. 88, Issue C, Aug. 2017, pp. 17-36.

\* cited by examiner

FIG. 2

```
Input:
Quality metrics
Bad smell examples
Process:
1.   I = set of rules
2.   P = set of I
3.   U = use case model
4.   repeat
5.       for all I in P do
6.           detected bad smells = execute_rules(U);
7.           fitness (I) = numberOfDetectedBadSmells;
8.       end for
9.       best_solution = best_fitness(I);
10.      P = new_population(P);
11.      it = it + 1;
12.  until it = max_bad_smells;
13.  return best_solution;
Output:
best_solution
```

FIG. 3

*R1: IF (isExtension (u) == true AND NumAss (u) >= 2) THEN missing hierarchy*

*R2: IF (isExtension (u) == true AND extending (u) >= 4) THEN missing modularization*

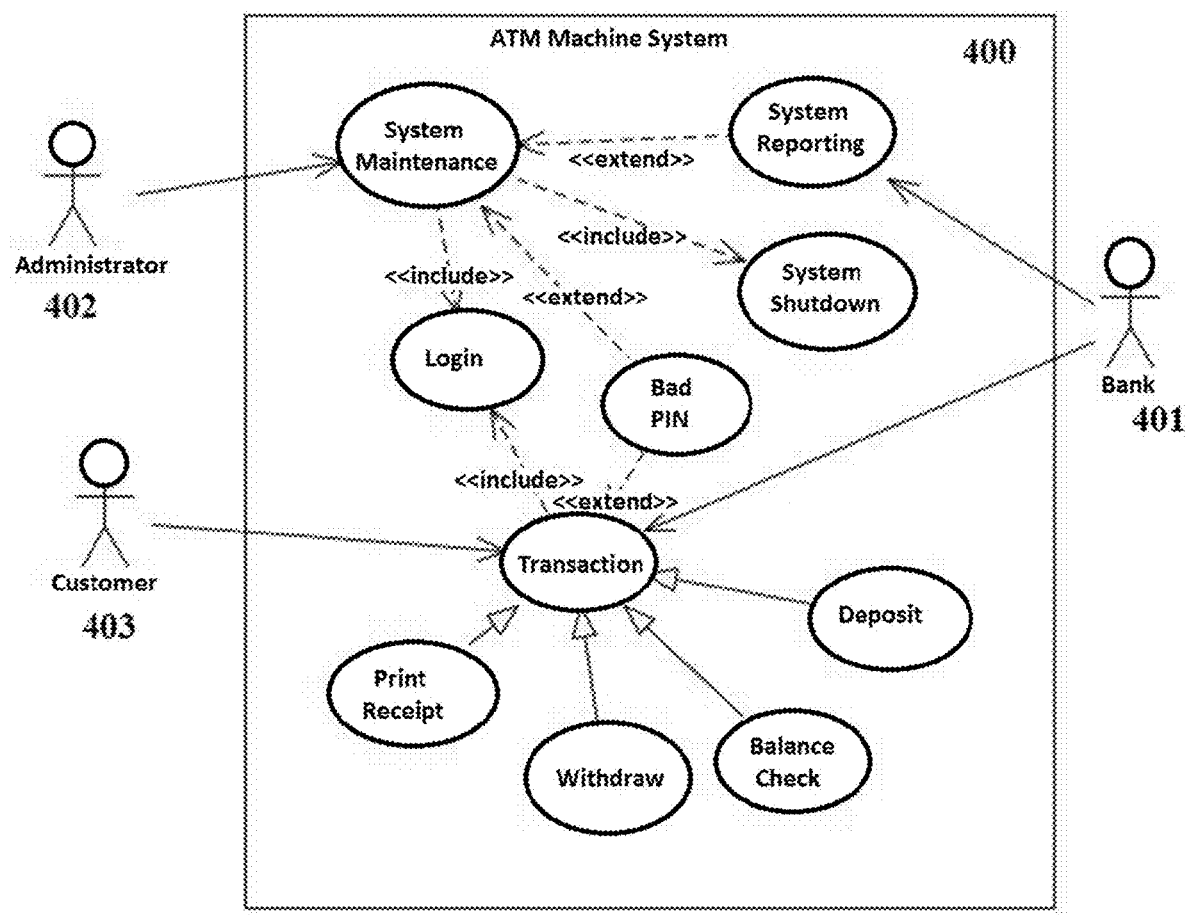

FIG. 8

R1: IF (isExtension (u) == true AND NumAss (u) >= 1) THEN missing hierarchy
R2: IF (isExtension (u) == true AND extending (u) >= 2) THEN missing modularization
R3: IF (isInclusion (u) == true AND included (u) == 1) THEN broken modularization

REFACTORING TO IMPROVE THE SECURITY QUALITY OF USE CASE MODELS

BACKGROUND

The Unified Modeling Language (UML) is a widely used analysis and design language for developing object-oriented systems. A use case-driven approach is used to textually document requirements in the form of use cases. A use case diagram is used to provide a visual summary of use cases, actors and their relationships. Use case modeling is performed at the early stage of requirements elicitations, and any design defects in use case diagrams propagate to the later stages of software development. Therefore, it is crucial to develop quality use case models through the early detection of poor design decisions to improve the overall end-product quality. These poor design decisions are commonly referred to as "bad smells", and taking the necessary measures to remove the bad smells is called "refactoring".

Security is one of the important quality attributes that reflects the ability of a system to prevent malicious actions and loss of information. A basic aim of secure software is to prevent unauthorized access and the modification of information. The fulfillment of security requirements at the requirements level is imperative to minimize the cost of addressing the security issue at later stages of the software development life cycle.

Despite the importance of security in use case models, there exists no study that focused on identifying bad smells and the related refactoring opportunities in use case models to investigate the impact of model refactoring on the security quality of use case models. In particular, there is a need to develop detection and correction techniques to identify and mitigate security bad smells from use case models.

SUMMARY

A system in accordance with the present disclosure will improve the security of use case models through applying software refactoring. Achievement of this goal can be broken down into multiple sub-objectives. Such a goal is achieved by a detection technique to identify security bad smells in use case models, a correction technique to correct security bad smells in use case models, and an empirical assessment of security improvements in use case models as a result of refactoring.

In accordance with the present disclosure, a method for improving security of a use case model may comprise: identifying security bad smells from a database; generating, by processing circuitry, a set of detection rules according to the identified security bad smells and quality metrics; applying the set of detection rules to the use case model to detect bad smells in the use case model; transforming, by the processing circuitry, the use case model into an XML, representation; generating first quality metrics of the XML, representation; refactoring, by the processing circuitry using the security bad smells, the XML representation of the use case model to generate a refactored XML representation of the use case model; exporting the refactored XML representation back to a refactored use case model; performing a behavior consistency verification processing by processing the refactored use case models; generating second quality metrics of the refactored XML representation; comparing, by the processing circuitry, the first quality metrics with the second quality metrics; and generating, by the processing circuitry and based on the comparison of the first quality metrics with the second quality metrics, a quality improvement assessment of security for the use case model.

In accordance with the present disclosure, an apparatus for improving security of a use case model may comprise processing circuitry that is configured to identify security bad smells from a database; generate a set of detection rules according to the identified security bad smells and quality metrics; apply the set of detection rules to the use case model to detect bad smells in a use case model; transform the use case model into an XML representation; generate first quality metrics of the XML representation; refactor, using the security bad smells, the XML representation of the use case model to generate a refactored XML representation of the use case model; export the refactored XML representation back to a refactored use case model; perform a behavior consistency verification processing by processing the refactored use case models; generate second quality metrics of the refactored XML representation; compare the first quality metrics with the second quality metrics; and generate, based on the comparison of the first quality metrics with the second quality metrics, a quality improvement assessment of security for the use case model.

In accordance with the present disclosure, a non-transitory computer readable medium storing computer executable instructions which, when executed by a computer, cause the computer to: identify security bad smells from a database; generate a set of detection rules according to the identified security bad smells and quality metrics; apply the set of detection rules to the use case model to detect bad smells in a use case model; transform the use case model into an XML representation; generate first quality metrics of the XML representation; refactor, using the security bad smells, the XML representation of the use case model to generate a refactored XML representation of the use case model; export the refactored XML representation back to a refactored use case model; perform a behavior consistency verification processing by processing the refactored use case models; generate second quality metrics of the refactored XML representation; compare the first quality metrics with the second quality metrics; and generate, based on the comparison of the first quality metrics with the second quality metrics, a quality improvement assessment of security for the use case model.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2 illustrates an exemplary algorithm in accordance with the present disclosure.

FIG. 3 illustrates individual detection rules for bad smells.

FIG. 4 illustrates a use case diagram of an automated teller machine (ATM) system.

FIG. 8 illustrates the detection rules generated by the exemplary algorithm of FIG. 2.

DETAILED DESCRIPTION OF THE DRAWINGS

Figure 1:
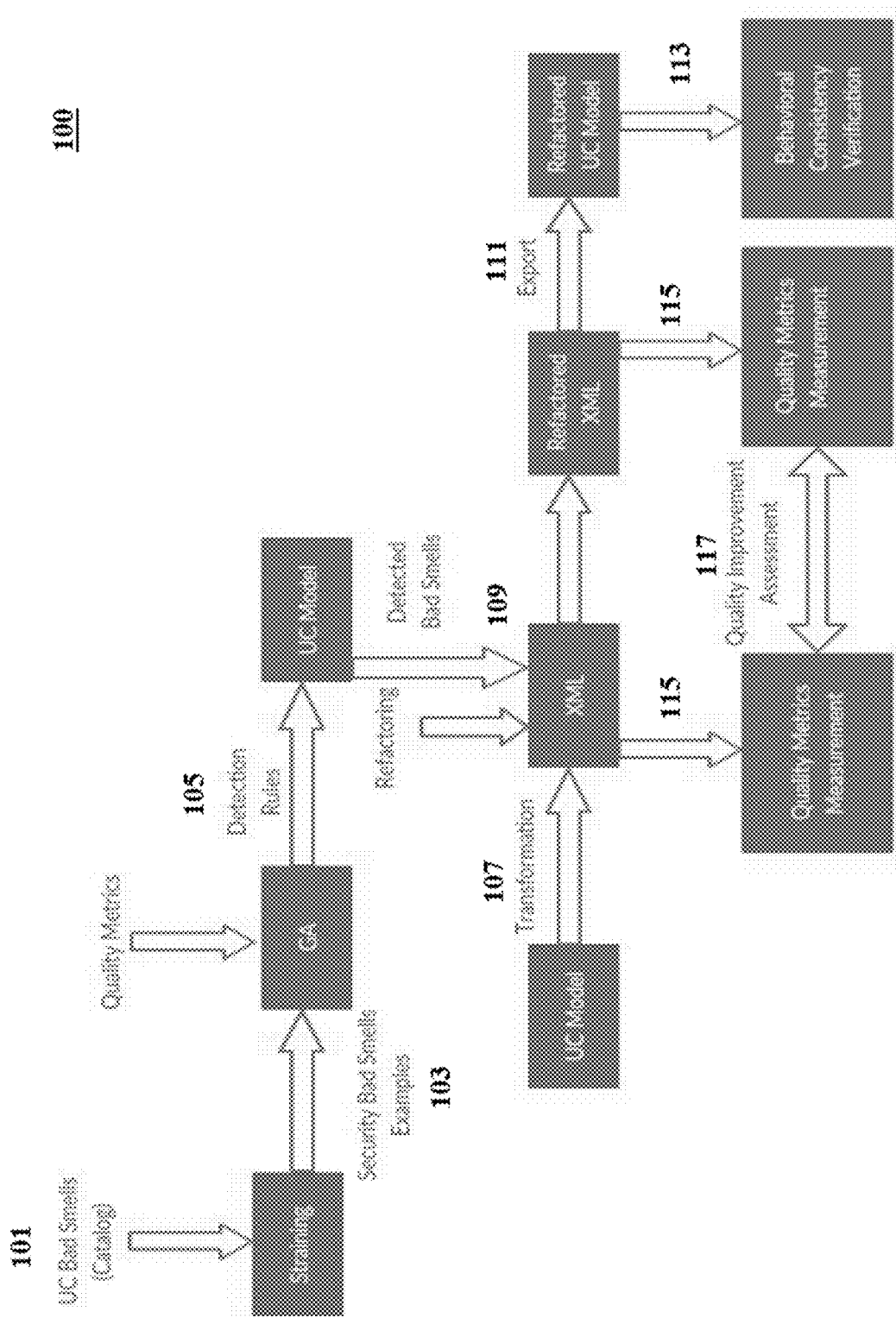
FIG. 1 illustrates an exemplary method for evaluating the quality improvement of security for use models in accordance with the present disclosure.

Referring now to the drawings, wherein like reference numerals designate identical or corresponding parts throughout the several views.

Use Case Bad Smells

In this disclosure, anti-patterns may be referred to and traded in use cases as bad smells. There are four main categories of design smells: Abstraction, Encapsulation, Modularization and Hierarchy. See Suryanarayana, G. Samarthyam, and T. Sharma, "Chapter 2—Design Smells," in *Refactoring for Software Design Smells*, G. Suryanarayana and G. S. Sharma, Eds., ed Boston: Morgan Kaufmann, 2015, pp. 9-19, which is hereby incorporated by reference in its entirety.

Each classification with the corresponding design smells is listed in the following Table 1:

TABLE 1

| Classification of design smells | |
|---|---|
| Classification | Design Smells |
| Abstraction | Missing, Imperative, Incomplete, Multifaceted, Unnecessary, Unutilized, Duplicate |
| Encapsulation | Deficient, Leaky, Missing, Unexploited |
| Modularization | Broken, Insufficient, Cyclically Dependent, Hub-like |
| Hierarchy | Missing, unnecessary, Unfactored, Wide, Speculative, Deep, Rebellious, Broken, Multipath, Cyclic |

In each classification, a significant number of design smells are reported. For example, in abstraction, there is a design smell, "missing abstraction", which emphasizes a compromise on the integrity of data. Similarly, in deficient encapsulation, the class attributes are likely to be exposed to outside classes.

Moreover, the following three security bad smells are considered and discussed in detail, however, other security bad smells (listed in Table 1 or otherwise) may apply to the methodologies and apparatuses discussed in this disclosure. The three security bad smells are:

Missing hierarchy: This bad smell aims to explicitly manage variation in hierarchical behavior, where a hierarchy could have been created for the expected behavior. This bad smell violates the reliability and integrity of data such that the access of an actor to an extension use case is inappropriate and leads to unexpected behavioral execution. The related refactoring strategy to cope with this bad smell is removing the connection with the inappropriate hierarchy interface.

Broken modularization: In the context of use case modeling, this bad smell happens when functionalities are split across multiple use cases using the include relationship. If an inclusion use case is included by a single use case, this bad smell occurs. It affects the confidentiality and integrity of data because functionalities are split and would require accessing from associations between inclusion and included use cases. The appropriate refactoring to overcome this bad smell is moving the inclusion use case functionality to the included use case.

Missing modularization: This bad smells occurs when an extension use case is extending more than one use cases. In other words, the extension use case is missing modularization in terms of providing exceptional functionality to a single use case. This bad smell violates the reliability and correctness of security attributes. The functionality of an extension use case must be confined to a single use case, otherwise, it would be uncertain which optional functionality to execute for which use case. The most effective refactoring strategy to eradicate this bad smell is splitting the extension use case into multiple use cases, depending on the number of extension relationships.

A few studies have addressed the issue of bad smells in a use case diagram and its description. See M. El-Attar and J. Miller, "Improving the quality of use case models using antipatterns," *Software & Systems Modeling*, vol. 9, pp. 141-160, 2010. M. El-Attar and J. Miller, "Constructing high quality use case models: a systematic review of current practices," Requirements Engineering, vol. 17, pp. 187-201, 2012. Y. A. Khan and M. El-Attar, "Using model transformation to refactor use case models based on antipatterns," *Information Systems Frontiers*, pp. 1-34, 2014. T. Arendt and G. Taentzer, "Uml model smells and model refactorings in early software development phases," *Universita ̈t Marburg*, 2010. G. Booch, J. Rumbaugh, and I. Jacobson, "The unified modeling language," *Unix Review*, vol. 14, p. 5, 1996. All of which are hereby incorporated by reference in their entirety.

A major contribution to the study of anti-patterns in a use case diagram is provided by El-Attar and Miller. Their objective was to improve the quality of a use case diagram and its description. They utilized anti-patterns to identify bad smells in use cases and refactor them to improve the quality of use cases. Their study influenced the quality of use cases in terms of correctness, consistency, analytical ability and understandability. Table 2 depicts the investigated use case anti-patterns and respective refactoring strategies. The bad smells considered are included in Table 2.

TABLE 2

| Use case anti-patterns and corresponding refactoring techniques | |
|---|---|
| Anti-pattern | Refactoring |
| Accessing a generalized concrete use case | r1. Concrete to Abstract r2. Drop Actor-Generalized use case Association |

TABLE 2-continued

Use case anti-patterns and corresponding refactoring techniques

| Anti-pattern | Refactoring |
| --- | --- |
| Accessing an extension use case [missing hierarchy] | r3. Drop Actor-Extension use case Association [applied refactoring]<br>r4. Directed Actor-Extension use case Association |
| Using extension/inclusion use cases to implement an abstract use case | r5. Abstract Extended use case to Concrete<br>r6. Inclusion to |
| Functional Decomposition: using the include relationship [broken modularization] | r7. Drop Functional Decomposition<br>r8. Drop Functional Decomposition having Inclusion [applied refactoring] |
| Functional Decomposition: using the extend relationship [missing modularization] | r9. Split Extension use case [applied refactoring]<br>r10. Extension to Generalization |
| Multiple generalizations of a use case | r11. Generalization to Include |
| Use cases including common and exceptional functionality | r12. Drop Inclusion<br>r13. Drop Extension |
| Multiple actors associated with one use case | r14. Generalize Actors<br>r15. Split use cases |
| An association between two actors | r16. Drop Actor-Actor Association |
| An association between use cases | r17. Drop use case-use case Association |
| An unassociated use case | r18. Drop Unassociated use case |
| Two actors with the same name | r19. Rename Actor |
| An actor associated with an unimplemented abstract use case | r20. Abstract to Concrete<br>r21. Add Concrete use case |

Bad Smell Detection and Refactoring

The classification of the bad smell detection techniques is presented by Misbhauddin and Alshayeb. See M. Misbhauddin and M. Alshayeb, "UML model refactoring: a systematic literature review," *Empirical Software Engineering*, vol. 20, pp. 206-251, 2013, which is hereby incorporated by reference in its entirety. They classified three detection strategies namely: design patterns, software metrics and pre-defined rules.

A few studies have been proposed using design patterns to detect bad smells on class diagrams. I. H. Moghadam and M. O. Cinneide, "Automated refactoring using design differencing," in *Software maintenance and reengineering (CSMA), 2012 16th European conference on*, 2012, pp. 43-52. C. Bouhours, H. Leblanc, and C. Percebois, "Bad smells in design and design patterns," *Journal of Object Technology*, vol. 8, pp. 43-63, 2009. D.-K. Kim, "Software quality improvement via pattern-based model refactoring," in *High Assurance Systems Engineering Symposium, 2008. HASE 2008. 11th IEEE*, 2008, pp. 293-302. E. Song, R. B. France, D.-K. Kim, and S. Ghosh, "Using roles for pattern-based model refactoring," in *Proceedings of the Workshop on Critical Systems Development with UML (CSDUML '02)*, 2002. All of which are hereby incorporated by reference in their entirety.

Detection in use case models is mainly achieved using rule-based techniques. Refactoring is the process of improving the structure of a model without changing its behavior and was introduced into source code by Opdkye. See M. Fowler, *Refactoring: improving the design of existing code*: Pearson Education India, 1999, and W. F. Opdyke, "Refactoring object-oriented frameworks," University of Illinois at Urbana-Champaign, 1992, both of which are incorporated by reference in their entirety. The refactoring concept has been extended to UML models to benefit from its ability to improve software model quality.

Rule-based techniques ensure the use of a specific template or standard rules to develop software artifacts. Rule-based techniques may be used to detect bad smells on class diagrams. For example, see E. Song, R. B. France, D.-K. Kim, and S. Ghosh, "Using roles for pattern-based model refactoring," in *Proceedings of the Workshop on Critical Systems Development with UML (CSDUML '02)*, 2002. A. Ouni, M. Kessentini, H. Sahraoui, and M. Boukadoum, "Maintainability defects detection and correction: a multi-objective approach," *Automated Software Engineering*, vol. 20, pp. 47-79, 2013 Mar. 1, 2013. M. T. Llano and R. Pooley, "UML specification and correction of object-oriented anti-patterns," in *Software Engineering Advances, 2009. ICSEA '09. Fourth International Conference on*, 2009, pp. 39-44. G. Sunyé, D. Pollet, Y. Le Traon, and J.-M. Jézéquel, "Refactoring UML models," in <<UML>>2001—The Unified Modeling Language. Modeling Languages, Concepts, and Tools, ed: Springer, 2001, pp. 134-148. M. Boger, T. Sturm, and P. Fragemann, "Refactoring browser for UML," in *Objects, components, architectures, services, and applications for a networked world*, ed: Springer, 2002, pp. 366-377. All of which are hereby incorporated by reference in their entirety.

In the context of this disclosure, only a few studies have used rule-based techniques to detect bad smells on use case diagrams. El-Attar and Miller (previously incorporated by reference) provided a template to specify use cases and relevant descriptions. They reported that their proposed template enhances consistency in use case diagrams and their descriptions. They presented a semi-automated technique based on anti-patterns which provides a framework for defining anti-patterns to provide remedies for common quality problems in use case diagrams. They claimed that the application of their proposed technique would result in the use case model being a more accurate representation of functional requirements. They also provided a repository of anti-patterns, including 26 domain independent anti-patterns. Using the same taxonomy of anti-patterns, Khan and El-Attar (previously incorporated by reference) proposed a technique to refactor the specified anti-patterns. They used the model transformation approach using OCL to detect and refactor use case diagrams.

Rui and Bulter described applying refactoring to use cases and formulating a meta-model for use case diagrams. See K. Rui and G. Butler, "Refactoring use case models: the meta-model," in *Proceedings of the 26th Australasian computer science conference—Volume 16*, 2003, pp. 301-308, the entirety of which is incorporated by reference. They extended the use case meta-model to include inclusion, extension, generalization, precedence, similarity and equivalence. Butler and Xu considered the concept of refactoring in use case modeling in the context of product lines. See G. Butler and L. Xu, "Cascaded refactoring for framework," in *ACM SIGSOFT Software Engineering Notes*, 2001, pp. 51-57, the entirety of which is hereby incorporated by reference.

Product line variability and evolution were used to refactor use case models. Yu et. al used refactoring rules based on episodes to improve the quality of use case models. See W. Yu, J. Li, and G. Butler, "Refactoring use case models on episodes," in *Proceedings of the 19th IEEE international conference on Automated software engineering*, 2004, pp. 328-331, the entirety of which is incorporated by reference. Kim and Doh proposed five use case refactoring strategies including: equivalence, decomposition, generalization, delete and merge. See Y. Kim and K.-G. Doh, "The service modeling process based on use case refactoring," in *International Conference on Business Information Systems*, 2007, pp. 108-120, the entirety of which is incorporated by reference.

These refactoring rules are implemented in the context of service-oriented architectures. Refactoring has also been used to improve the quality of use case descriptions. Issa and Ramos et. al illustrated the use of refactoring in use case descriptions. See A. Issa, "Utilising Refactoring To Restructure Use-Case Models," in *World Congress on Engineering*, 2007, pp. 523-527, and R. Ramos, E. Piveta, J. Castro, J. Araújo, A. Moreira, P. Guerreiro, et al., "Improving the quality of requirements with refactoring," *VI Simpósio Brasileiro de Qualidade de Software—SBQS2007, Porto de Galinhas, Recife, Pernambuco, Brasil*, 2007, both of which are incorporated by reference in their entirety.

Scant research has been conducted in the area of detecting bad smells in use case models using model metrics. Arendt and Taentzer used model metrics and model smells to propose a detection process. See T. Arendt, F. Mantz, and G. Taentzer, "EMF refactor: specification and application of model refactorings within the Eclipse Modeling Framework," in *of the BENEVOL workshop*, 2010, the entirety of which is incorporated by reference. They presented a study which integrates two tools, eclipse modeling framework (EMF) Smell and EMF Refactor, which enables the automatic detection and removal of model smells by applying the suggested refactoring in a class diagram and use case diagram. They investigated only one bad smell (unused use case) related to use case modeling. The goal of EMF Smell is to identify a model smell against a meta-model and present them in an understandable way. EMF Refactor consists of three main components: code generation module, refactoring application module and EMF model refactoring suite.

Observations may be made based on the aforementioned detection techniques. Table 3 summarizes the surveyed detection strategies and provides a comprehensive overview of the related literature.

TABLE 3

Summary of related work

| Author(s) | Technique | Bad Smells | Tool Support |
|---|---|---|---|
| Arendt and Taentzer | Metrics-based | Unused use case | Yes |
| El-Attar and Miller | Rule-based | Accessing a generalized use case, use case including common and exceptional functionality, functional decompositions, accessing an extension use case, multiple actors associated with one use case. | Yes |
| Khan and El-Attar | Rule-based | Accessing a generalized use case, use case including common and exceptional functionality, functional decompositions, accessing an extension use case, multiple actors associated with one use case, an association between actors, an association between use cases, an unassociated use case. | No |
| Rui and Bulter | Rule-based | Absent use case, unused use case, improper use case name, moving an element of use case. | No |
| Butler and Xu | Rule-based | Missing abstraction, broken modularization, missing modularization. | No |
| Yu et al. | Rule-based | Unused use case, use case duplication, equivalent use case, missing abstraction. | No |
| Issa | Rule-based | Broken modularization, missing abstraction, unnecessary hierarchy, missing hierarchy. | No |
| Ramos et al. | Rule-based | Missing modularization, broken modularization, duplicate abstraction. | No |

Model smells in use cases are detected using metrics and pre-defined rules. In the case of the metrics-based technique, only one bad smell is studied, while rule-based techniques investigate a large set of bad smells. Related literature has not studied bad smells in use case models from a security point of view. Another concern to be noted is the lack of work investigating the impact of refactoring on the quality of use case models from a security perspective. As a result of these gaps in the literature, the inventors studied bad smells from a security perspective, formulated a method and system for assessing the impact of refactoring on quality improvement in use case models.

Figure 13:
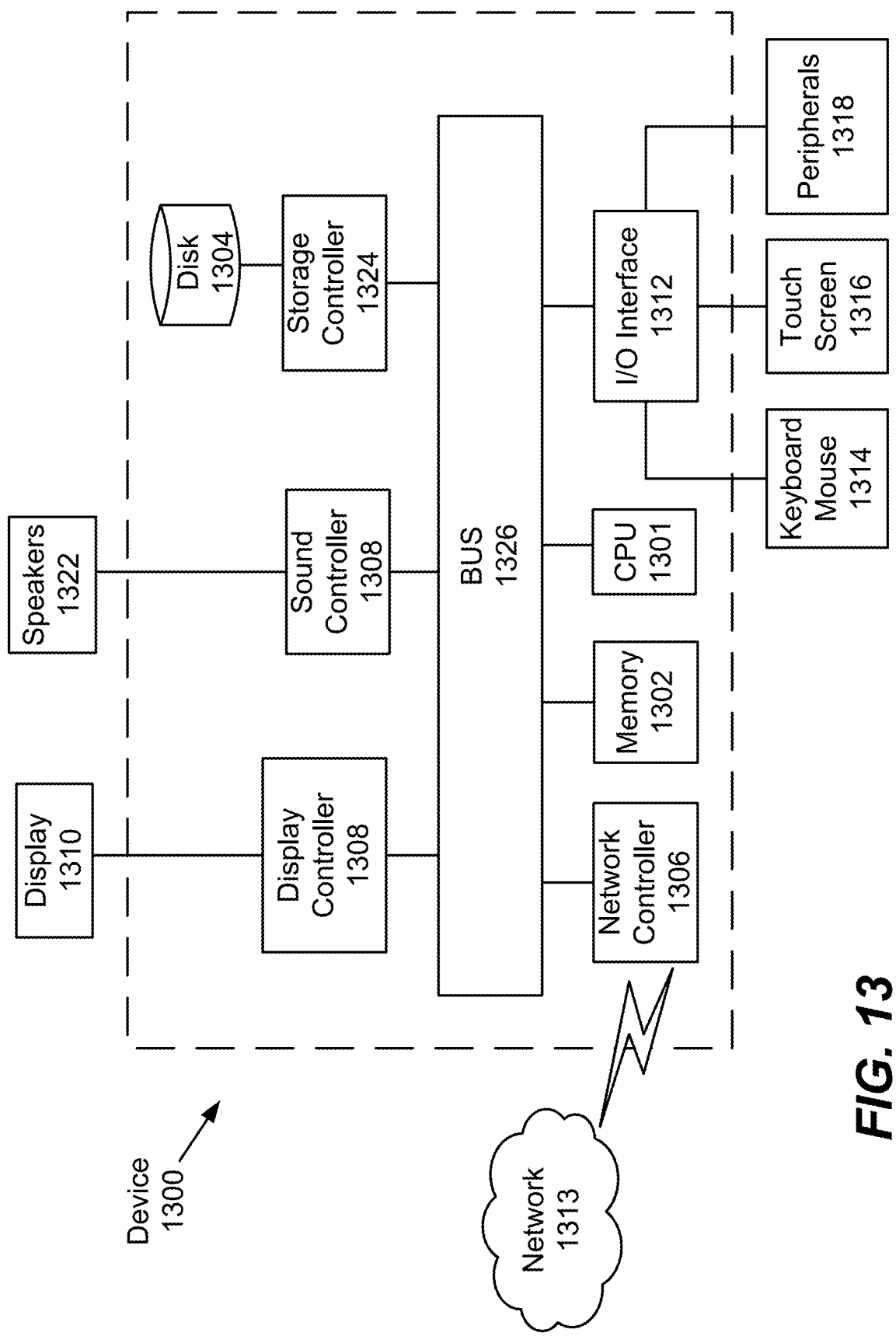
FIG. 13 illustrates exemplary hardware of an apparatus in accordance with the present disclosure.
Figure 14:
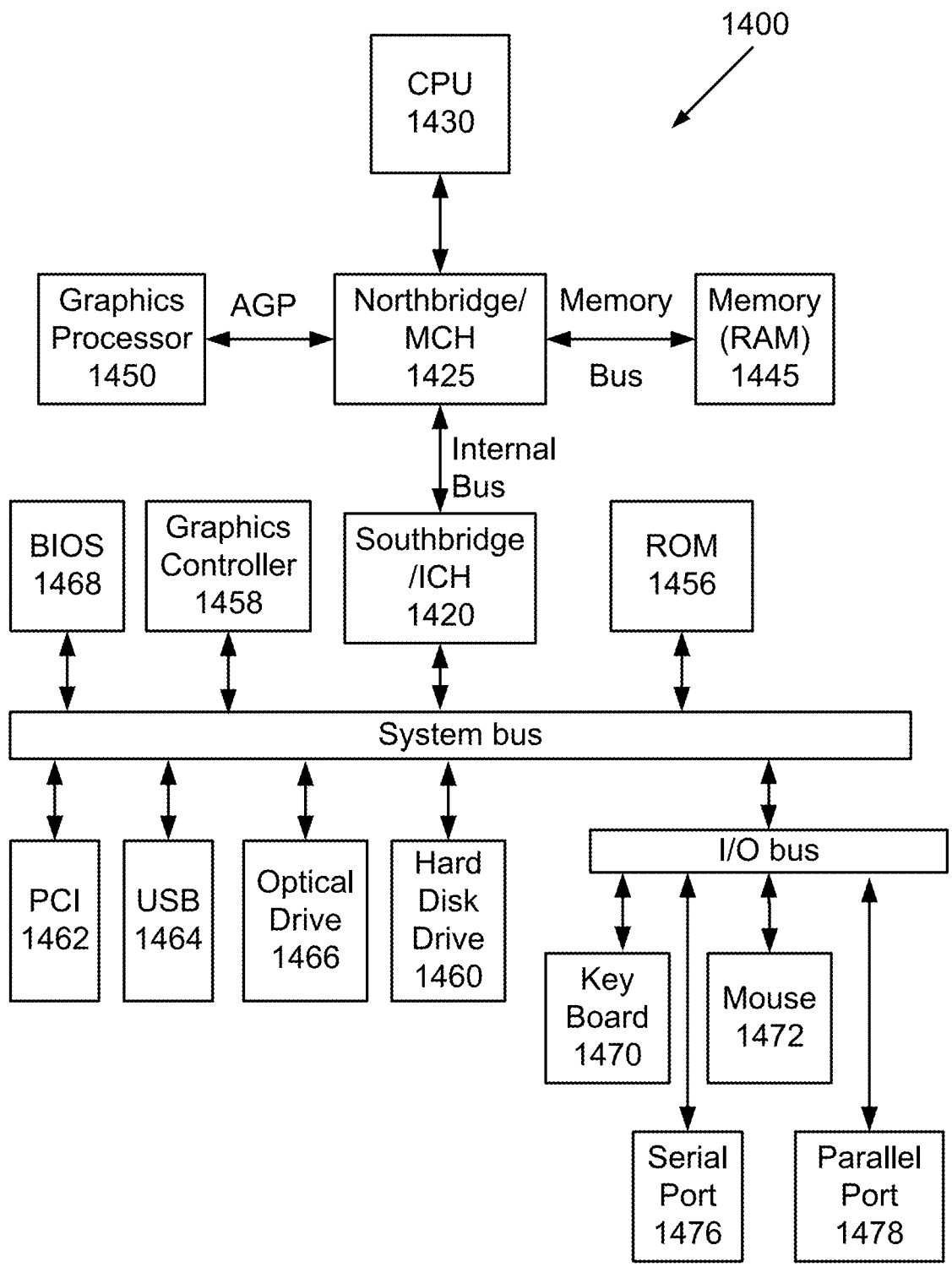
FIG. 14 illustrates a schematic diagram of a data processing system in accordance with this disclosure.
Figure 15:
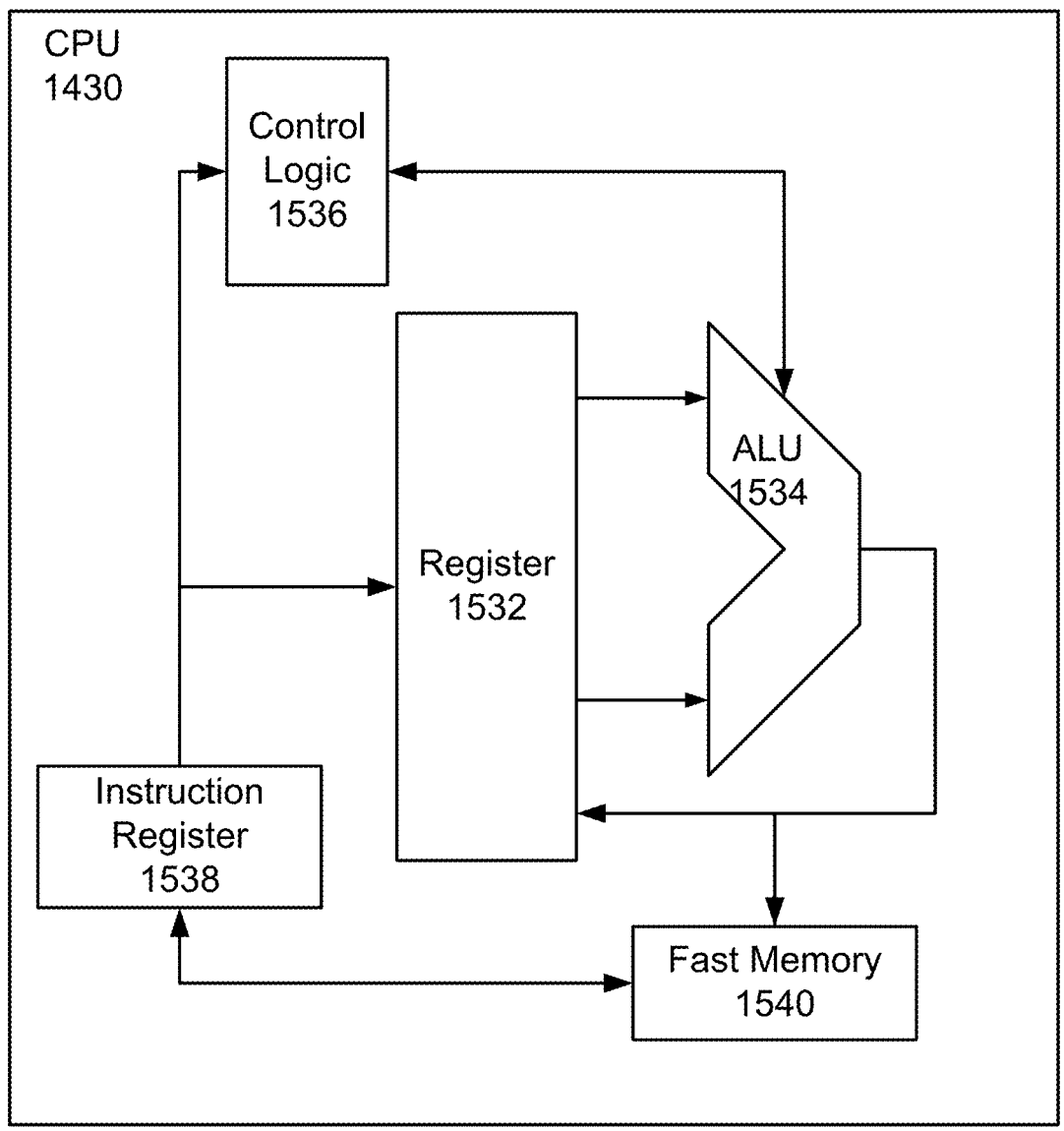
FIG. 15 illustrates an exemplary implementation of CPU 1430 of data processing system 1400.

FIG. 1 illustrates a method 100 for evaluating the quality improvement of security for use models. In particular, FIG. 1 illustrates an exemplary algorithmic flowchart of method 100 for the performance of evaluating the quality improvement of security for use models according to one aspect of the present disclosure. Method 100 may be performed by device 1300, which is discussed later with reference to FIGS. 13-15. FIGS. 13-15 illustrate specialized corresponding structure that is programmed or configured to perform the algorithm illustrated in FIG. 1. For example, the algorithm shown in FIG. 1 may be completely performed by circuitry or processing circuitry included in or separate from the single device shown in FIG. 13 or the chipset as shown in FIG. 14.

In step 101, security bad smells are identified from existing bad smell database which, for example, may include catalogues of known security bad smells. For example, processing circuitry may identify security bad smells for use case models according to the design smell catalogue of Suryanarayana et al. ("Chapter 2—Design Smells," in *Refactoring for Software Design Smells*, previously cited), the disclosure of which is hereby incorporated in its entirety. In the catalogue, the violation of several security attributes by design smells are reported. If a bad smell violates any security attribute, it is considered a security bad smell. In one example, the following three security bad smells are selected: missing hierarchy, broken modularization and missing modularization. The definition of each security bad smell, along with the security requirements it violates, and appropriate refactoring, are presented in Table A. See also, M. Fowler, Refactoring: improving the design of existing code: Pearson Education India, 1999. Martin Fowler (2016, 24 Feb.), http://refactoring.com/. W. H. Brown, R. C. Malveau, and T. J. Mowbray, "AntiPatterns: refactoring software, architectures, and projects in crisis," 1998. All of which are hereby incorporated by reference in their entirety. However, other security bad smells may be identified and such identification may be performed according to other methodologies and smell catalogues.

In step 103, the identified security bad smells, along with the relevant quality metrics, are used as input to an exemplary algorithm, which will be discussed later with reference to FIG. 2. For example, processing circuitry may input the identified security bad smells into the exemplary algorithm, and then execute the exemplary algorithm. The algorithm produces a set of detection rules for the automatic detection of security vulnerabilities in use case models. However, other algorithms may be utilized and performed by the processing circuitry.

In step 105, the detection rules are applied to use case models to detect bad smells. The processing circuitry detects bad smells by applying the detection rules to use case models.

To undertake the correction process, the processing circuitry transforms the use case models into extensible markup language (XML) representations in step 107. In step 109, the processing circuitry applies the detected security bad smells output from step 105 (the application of detection rules to use case models) and relevant refactoring strategies to the XML representations of use case models. The processing circuitry generates refactored XML representations as a result of step 109.

In step 111, the processing circuitry exports the refactored XML representations back to corresponding refactored use case models. In step 113, the processing circuitry performs a behavior consistency verification processing by processing the refactored use case models using post refactoring conditions so as to ensure behavioral preservation. In step 115,

TABLE A

Taxonomy of Security Bad Smells

| Bad Smell | Description | Security Violation | Refactoring |
| --- | --- | --- | --- |
| Missing Abstraction | In the absence of an abstraction, the data and behavior are spread across the design. | Confidentiality, Secrecy, Guarded Access, Integrity, Insecure Info Flow. | Replace type-code with class. |
| Incomplete Abstraction | When an abstraction does not support complementary or interrelated methods. | Correctness, Integrity | Introduce the missing complementary operation(s) |
| Multifaceted Abstraction | When an abstraction is assigned more than one responsibility. | Correctness, Integrity | Extract class |
| Unutilized Abstraction | When an unused abstraction is accidentally invoked, it may result in runtime problems. | Integrity, Reliability | Remove unutilized abstraction. |
| Duplicate Abstraction | When two abstractions have the same name, it is confusing which abstraction to invoke. | Non-repudiation, Integrity. | Rename abstraction, remove abstraction. |
| Deficient Encapsulation | It provides direct access of class data to outside classes. | Confidentiality, Secrecy, Guarded Access, Integrity. | Encapsulate field |
| Leaky Encapsulation | When internal data structures are leaked, the integrity of the abstraction may be compromised | Confidentiality, Secrecy, Guarded Access, Integrity. | Encapsulate field and methods (if necessary) |
| Missing Encapsulation | When implementation variations are not encapsulated | Confidentiality, Secrecy, Guarded Access, Integrity. | Encapsulate field and methods (if necessary) |
| Broken Modularization | The data and related procedures are split across abstractions | Confidentiality, Secrecy, Guarded Access, Integrity. | Move method/Field |
| Cyclically dependent Modularization | Changes to a cyclically dependent abstraction can lead to runtime problems across other abstractions | Integrity | Move method or field |
| Missing Modularization | When a class is not decomposed | Reliability, Correctness | Extract class, Move methods |
| Rebellious Hierarchy | When a subtype rejects the methods provided by its super-type | Reliability, Correctness, Integrity. | Apply move method from the super-type to the relevant subtypes |
| Unnecessary Hierarchy | When inheritance is applied unnecessarily for a particular design context | Integrity, Insecure Info Flow. | Collapse hierarchy |
| Missing Hierarchy | To explicitly manage variation in hierarchical behavior, where a hierarchy could have been created and used to encapsulate those variations | Reliability, Integrity | Connection with appropriate hierarchy interface should be made |
| Broken Hierarchy | When developers are not aware that the super-type and subtype do not share an IS-A relationship | Confidentiality, Secrecy, Guarded Access, Insecure Info Flow, Integrity. | Replace inheritance with delegation | the processing circuitry computes quality metrics before and after refactoring by using the XML representations of the use case models. Finally, in step 117, the processing circuitry compares the quality metrics computed before and after refactoring to generate a quality improvement assessment of security for the use case models.

Gaps identified in the literature are addressed and remedied by the detection and correction approaches in this disclosure. In one example, the detection approach may use an approach proposed by Ouni et al. ("Maintainability defects detection and correction: a multi-objective approach," previously cited), however, this disclosure implements changes in the algorithm process, specifically for crossover and mutation operations in addition to using security bad smells instead of normal class level bad smells. Different sets of bad smells may require the use of a different set of quality metrics.

The collection of quality metrics in step 115 of method 100, illustrated in FIG. 1, is accomplished using the SDMetrics tool. *See SDMetrics* (2016, 6 Jun.), http://www.sdmetrics.com/, the contents of which is hereby incorporated by reference in its entirety.

The construction of the use case diagrams is performed using Enterprise Architect (EA). See Enterprise Architect, S. Systems, http://www.sparxsystems.com/products/ea/, the contents of which is hereby incorporated by reference in its entirety.

EA is used for model transformation from a use case to XML. Visual Studio is utilized to implement the algorithm. See Visual Studio, Microsoft (2010), https://www.visualstudio.com/, the contents of which is hereby incorporated by reference in its entirety.

FIG. 2 illustrates an exemplary algorithm in accordance with the present disclosure. The processing circuitry executes the algorithm to generate detection rules by using security bad smell examples and relevant quality metrics. The quality metrics are collected using the SDMetrics tool. The near optimal solution obtained from the algorithm presents the rules that detects the maximum number of security bad smells in use case models.

Exemplary pseudo-code of the algorithm is presented in FIG. 2. The algorithm takes quality metrics and bad smell examples as inputs, in step 103 of FIG. 1, to produce a set of detection rules to detect security bad smells in use case models. The algorithm stops when the maximum number of the security bad smells are detected.

Individuals may be composed of three rules, each of which specifies a different bad smell. For example, the three rules may specify for a missing hierarchy, a broken modularization and a missing modularization. Such is illustrated in FIG. 3.

FIG. 3 illustrates individual detection rules for bad smells. The security bad smell is detected when the metric meets the threshold conditions specified in the individual rule.

For crossover and mutation, the individuals may be selected based on their relevant fitness value. A fitness value is calculated for each individual in each iteration. Two thirds of the best-fitted individuals are selected while the remaining one-third are discarded. The discarded population is regenerated from the selected ones through crossover and mutation. For crossover, one of the three rules is randomly selected and swapped with the same in another individual to create two new individuals. The mutation is achieved by changing quality metric values by randomly selecting an individual and corresponding rule. Depending on the generated rule, metric values can either be increased or decreased by one.

A fitness function calculates a number of detected bad smells compared to a total number of existing bad smells in the use case model. The fitness value is incremented by one when a rule is able to detect a security bad smell. The mathematical representation of fitness is provided as follows:

$$f(I) = \sum_{i=1}^{D} (s_i)$$

where f(I) computes the fitness of an individual I, D represents the number of defects in the use case diagrams, and $s_i$ has a value of 1 if the ith defect is detected by the rule, and value of 0 if otherwise. Individuals with the highest fitness value are selected for crossover and mutation operations. Maximum fitness is achieved when the individuals are able to detect all the bad smells present in the model.

The correction of security bad smells is achieved through model transformation. The use case diagrams are first transformed into XML, then quality metrics are extracted (steps 107 and 109 of method 100). The XML representation of the use case diagrams is corrected based on the refactoring of the identified security bad smells. The detected security bad smells in a use case model can easily be traced in the corresponding XML representation. Once refactoring is successfully applied, the corrected XML representations are exported back to the corresponding use case models. In this way, the use case models no longer include security bad smells. To maintain consistency between the original and the refactored models, post-conditions, which are validated after applying refactoring, are used.

Metrics are used to assess the quality improvement, as a result of refactoring, in security in step 117 of method 100. The metrics are measured before and after refactoring to assess the change in the metric values. A pair-wise t-test is applied to provide statistical evidence of the impact of the changed metrics. See G. W. Heiman, *Basic Statistics for the Behavioral Sciences*: Wadsworth Publishing, 2010, the entirety of which is incorporated by reference.

Implementation of method 100 will now be explained with reference to FIGS. 4-12. Guidelines in Jedlitschka et al. are used to present the empirical validation. See A. Jedlitschka, M. Ciolkowski, and D. Pfahl, "Reporting Experiments in Software Engineering," in *Guide to Advanced Empirical Software Engineering*, F. Shull, J. Singer, and D. I. K. Sjoberg, Eds., ed London: Springer London, 2008, pp. 201-228, the entirety of which is incorporated by reference.

A result of the implementation of method 100, using a Goal Question Metric (GQM) approach, is as follows: "*Analyze the model refactoring to security bad smells to improve the quality of use case models with respect to security*". See V. R. B.-G. Caldiera and H. D. Rombach, "Goal question metric paradigm," *Encyclopedia of Software Engineering*, vol. 1, pp. 528-532, 1994, the entirety of which is incorporated by reference.

Such a result is broken down into multiple sub-results. The sub-results include the successful detection and correction of security bad smells and the extent refactoring may improve software in terms of security. Experimentation was performed by the inventors to achieve the sub-results, which are as follows:

Experimental Question (EQ)1: To what extent can the proposed detection approach detect security bad smells in use case models?

EQ2: To what extent can the correction to security remove bad smells in use case models?

EQ3: To what extent can refactoring security bad smells improve the security aspects of use case models?

Experimental Materials

Four use case models belonging to four different systems were used in the experiments. See Cinergix (2016, 10 Jun.), Creately, http://creately.com/, the contents of which is hereby incorporated by reference in its entirety. The descriptive statistics of the four use case diagrams are presented in Table 4. The statistics are presented in terms of the number of use cases present in the system, the number of actors interacting with the system, the number of includes relationships and the number of extends relationships.

TABLE 4

Statistics on the investigated use case diagrams

| System | Use cases | Actors | Includes | Extends |
|---|---|---|---|---|
| ATM system 400 (FIG. 4) | 10 | 3 | 3 | 3 |
| HR system 500 (FIG. 5) | 8 | 4 | 3 | 4 |
| Restaurant system 600 (FIG. 6) | 13 | 4 | 1 | 10 |
| Travel agency system 700 (FIG. 7) | 9 | 5 | 1 | 6 |

The security bad smells investigated in the use case diagram are: missing hierarchy, broken modularization and missing modularization. Multiple instances (total 27) of these three security bad smells are present in the use case diagrams.

FIG. 4 illustrates a use case diagram of an automated teller machine (ATM) system 400.

Three actors are interacting with the system. The three actors are bank 401, administrator 402 and customer 403. ATM system 400 offers four types of transactions: deposit, balance check, withdraw and print receipt, all of which have generalization relationships.

Transactions and system maintenance typically require an actor's login. For example, customer 403 will be prompted to login (input a pin) when attempting to withdraw money.

Both of these use cases (transactions and system maintenance) can lead to the execution exception of a "Bad Pin" use case. ATM system 400 may include three security bad smells: missing hierarchy, broken modularization and missing modularization. The instances where these three bad smells are present are listed as follows, along with a bad smell identifier (UBx):

Missing hierarchy (UB1): Bank 401 accesses the "System Reporting" extension use case.

Missing modularization (UB2): A "Bad Pin" use case in either "System Maintenance" or "Transaction".

Broken modularization (UB3): "System Shutdown" in use case "System Maintenance".

Although these three security bad smells are discussed, other security bad smells may occur and be detected in ATM system 400.

Figure 5:
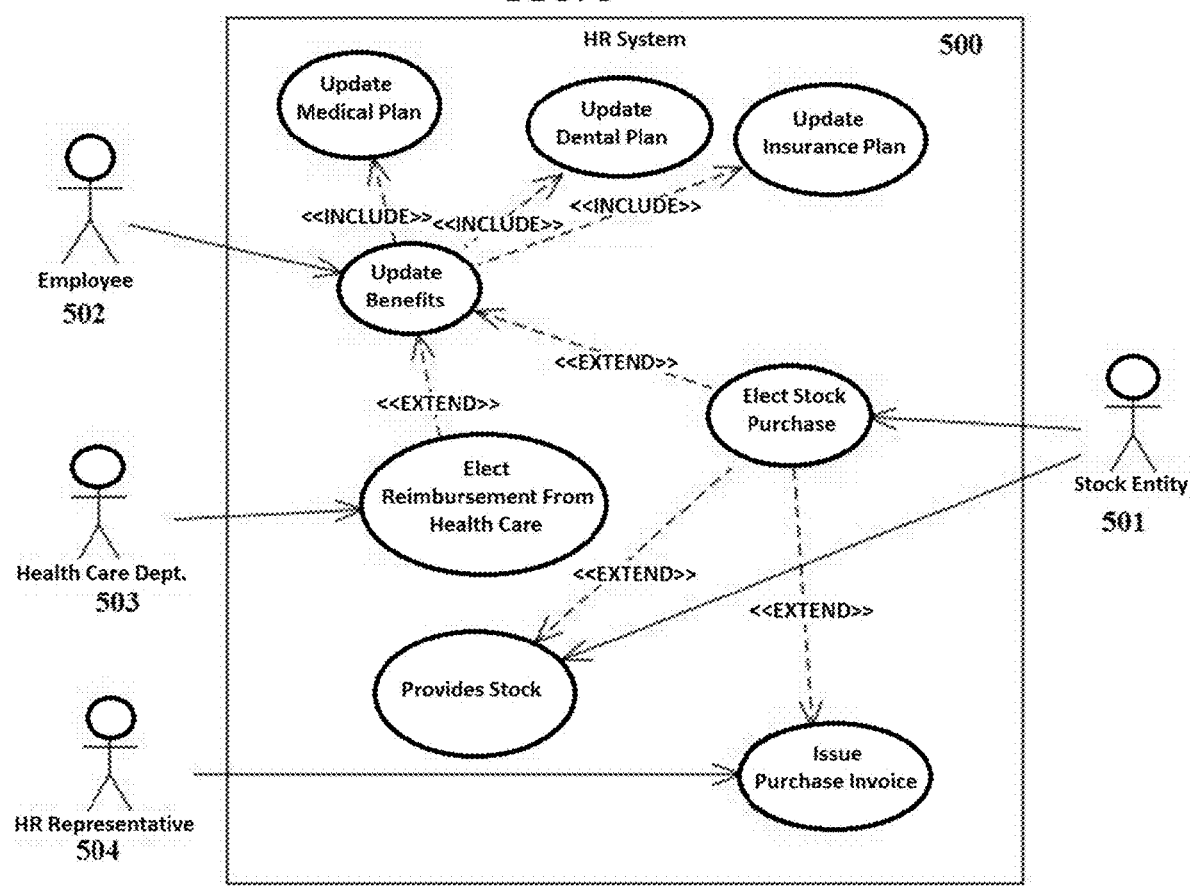
FIG. 5 illustrates a use case diagram of human resource (HR) system.

FIG. 5 illustrates a use case diagram of human resource (HR) system 500.

HR system 500 may provide multiple services such as update benefits, elect reimbursements from health care, elect stock purchases and issue purchase invoices. The actors that interact with HR system 500 are stock entity 501, employee 502, health care department 503 and HR representative 504.

In addition to receiving benefits updates, an employee 502 has the option of electing reimbursement and stock purchases. The stock entity 501 is responsible for electing and purchasing stock. The purchase invoice for stock is issued by a HR representative 504. Health care department 503 elects reimbursements from health care.

The HR system 500 may include three security bad smells: missing hierarchy, broken modularization and missing modularization. Other security bad smells may occur and be detected at HR system 500, however. The three instances where these bad smells may occur are listed as follows:

Missing hierarchy (UB4): Health care department 503 accesses the "Elect Reimbursement from Health Care" extension use case.

Missing hierarchy (UB5): Stock Entity 501 accesses the "Elect Stock Purchase" extension use case.

Missing modularization (UB6): The "Elect Stock Purchase" use case is extending three use cases: "Update Benefits", "Provides Stock" and "Issue Purchase Invoice".

Broken modularization (UB7): The "Update Dental Plan" is included in only one use case "Update Benefits".

Broken modularization (UB8): The "Update Insurance Plan" is included in only one use case "Update Benefits".

Broken modularization (UB9): The "Update Medical Plan" is included in only one use case "Update Benefits".

Figure 6:
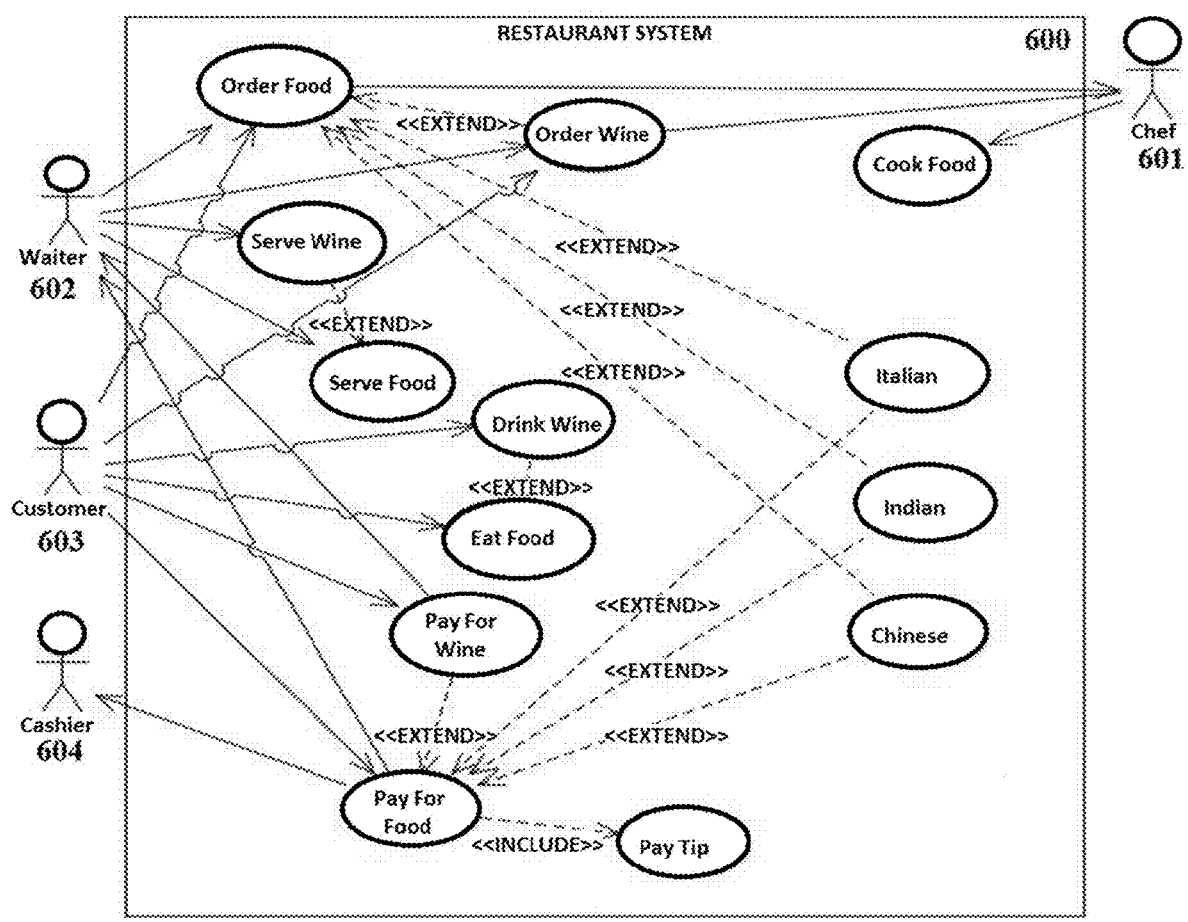
FIG. 6 illustrates a use case diagram of restaurant system.

FIG. 6 illustrates a use case diagram of restaurant system 600.

The main services offered by restaurant system 600 are order food, cook food, serve food, eat food and pay for food. Other services may be offered by restaurant system 600. The actors that interact with restaurant system 600 are chef 601, waiter 602, customer 603 and cashier 604.

The restaurant system 600 includes three security bad smells: missing hierarchy, broken modularization and missing modularization. Other security bad smells may occur and be detected at restaurant system 600, however. The three instances where these bad smells occur are listed as follows:

Missing hierarchy (UB10): Waiter 602 accesses the "Order Wine" extension use case.

Missing hierarchy (UB11): Customer 603 accesses the "Order Wine" extension use case.

Missing hierarchy (UB12): Chef 601 accesses the "Order Wine" extension use case.

Missing hierarchy (UB13): Waiter 602 accesses the "Serve Wine" extension use case.

Missing hierarchy (UB14): Customer 603 accesses the "Drink Wine" extension use case.

Missing hierarchy (UB15): Customer 603 accesses the "Pay for Wine" extension use case.

Missing hierarchy (UB16): Waiter 602 accesses the "Pay for Wine" extension use case.

Missing modularization (UB17): Chinese food use case extends in two use cases: "Order Food" and "Pay for Food".

Missing modularization (UB18): Italian food use case extends in two use cases: "Order Food" and "Pay for Food".

Missing modularization (UB19): Indian food use case extends in two use cases: "Order Food" and "Pay for Food".

Broken modularization (UB20): "Pay tip" is included in use case "Pay for Food".

Figure 7:
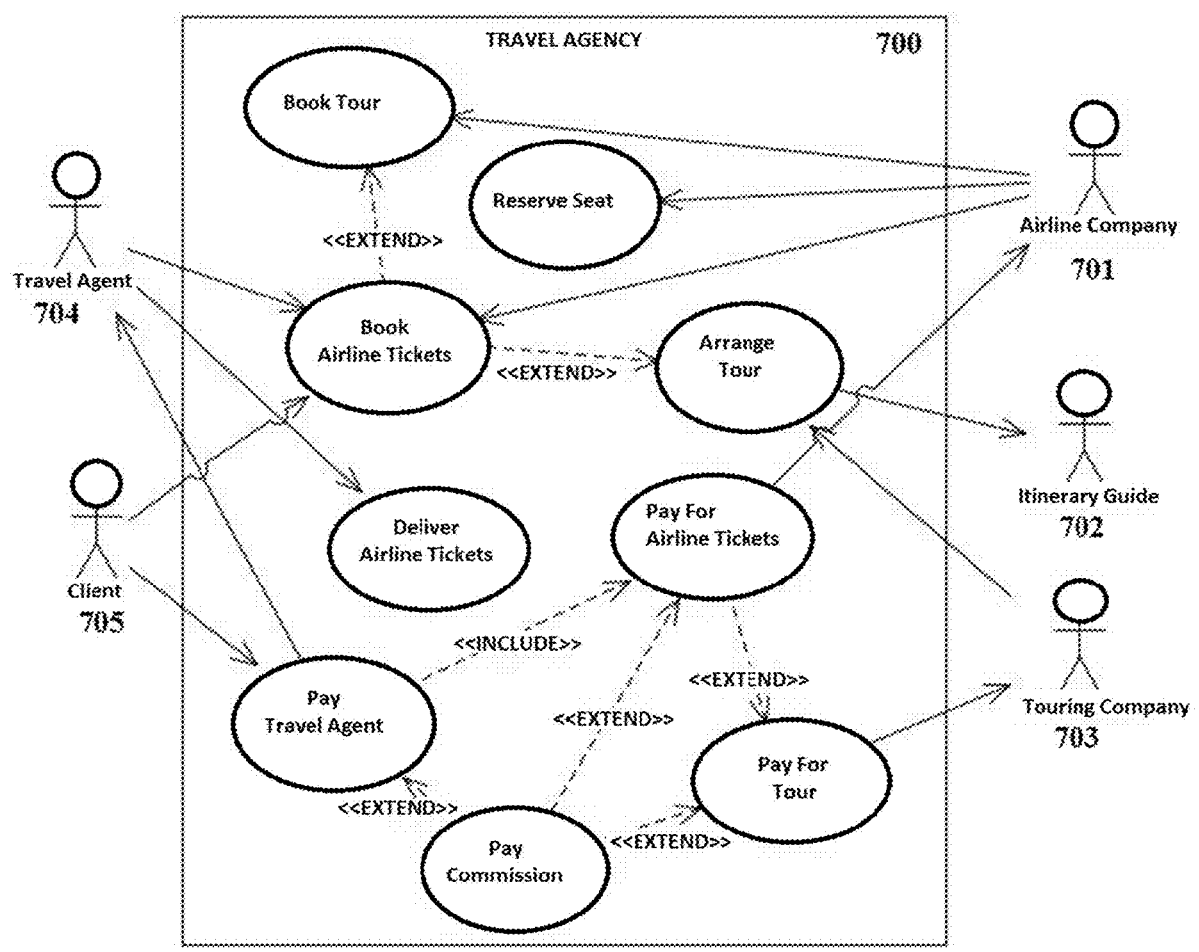
FIG. 7 illustrates a use case diagram for travel agency system.

FIG. 7 illustrates a use case diagram for travel agency system 700. The actors that interact with travel agency system 700 are airline company 701, itinerary guide 702, touring company 703, travel agent 704 and client 705. Travel agency system 700 is responsible for booking and issuing tickets and tours. Travel agency system 700 may include three security bad smells: missing hierarchy, broken modularization and missing modularization. Other bad smells may occur and be detected at travel agency system 700, however. The three instances where these bad smells occur are listed as follows:

Missing hierarchy (UB21): Travel agent 704 accesses the "Book Airline Tickets" extension use case.

Missing hierarchy (UB22): Airline Company 701 accesses the "Book Airline Tickets" extension use case.

Missing hierarchy (UB23): Client 705 accesses the "Book Airline Tickets" extension use case.

Missing hierarchy (UB24): Airline Company 701 accesses the "Pay for Airline Tickets" extension use case.

Missing modularization (UB25): the "Book Airline Tickets" use case extends in two use cases: "Book Tour" and "Arrange Tour".

Missing modularization (UB26): the "Pay Commission" use case extends in three use cases: "Pay Travel Agent", "Pay for Airline Tickets" and "Pay for Tour".

Broken modularization (UB27): "Pay for Airline Tickets" is included in just one use case "Pay Travel Agent".

In the experimentation performed by the inventors and discussed in this disclosure, the model quality is determined based on security bad smells and quality metrics. That is, model quality is the dependent variable and the independent variables are security bad smells and quality metrics.

Use recall for the security bad smells in the use case diagrams are the measure for the independent variable in the detection phase. For the correction phase, the independent variable is the correction efficacy in terms of removal percentage of security bad smells. For a quantitative assessment of the security improvement, quality metrics are used for the independent variable. The quality metrics selected for the use case diagrams are as follows:

NumAss: Number of associations between a use case and actor(s).

Including: The number of use case(s) a use case includes.

Included: The number of use case(s) included by an inclusion use case.

Extended: The number of use case(s) extended by an extension use case.

Extending: The number of use case(s) a use case extends.

In testing performed by the inventors and discussed in this disclosure, the following hypotheses were formulated to statistically validate the effectiveness of the proposed approaches:

Hypothesis 1 (EQ1): The proposed detection technique is able to identify a significant number of security bad smells in the investigated use case diagrams.

Null Hypothesis ($H_{01}$): The detection approach is unable to identify a significant number of security bad smells in the investigated use case diagrams as indicated by its recall.

Alternate Hypothesis ($H_{11}$): The detection approach is able to identify a significant number of security bad smells in the investigated use case diagrams as indicated by its recall.

The null hypothesis ($H_{01}$) is rejected in the case where the detection recall (DR) of the detection technique is significant in terms of identifying the security bad smells in the investigated use case diagrams. The quantification of the hypothesis is necessary for later testing and is presented as follows in terms of detection recall:

Null Hypothesis ($H_{01}$): DR<80%

Alternate Hypothesis (H11): DR>=80%

Hypothesis 2 (EQ2): The proposed correction technique is able to remove a significant number of security bad smells in the investigated use case diagrams.

Null Hypothesis ($H_{02}$): The correction approach is unable to remove a significant number of security bad smells in the investigated use case diagrams as indicated by its correction effectiveness.

Alternate Hypothesis ($H_{12}$): The correction approach is able to remove a significant number of security bad smells in the investigated use case diagrams as indicated by its correction effectiveness.

The null hypothesis ($H_{02}$) is rejected in the case where the correction efficacy (CE) of the correction technique is significant in terms of removing the security bad smells in the investigated use case diagrams. The quantification of the hypothesis is necessary for later testing and is presented as follows in terms of correction efficacy:

Null Hypothesis ($H_{02}$): CE<80%

Alternate Hypothesis ($H_{12}$): CE>=80%

Hypothesis 3 (EQ3): Refactoring security bad smells improves the investigated use case diagrams from a security perspective.

Null Hypothesis ($H_{03}$): No difference is observed in the security quality of the investigated use case diagrams as a result of refactoring security bad smells, as indicated by quality metrics.

Alternate Hypothesis ($H_{13}$): A significant difference is observed in the security quality of the investigated use case diagrams as a result of refactoring security bad smells, as indicated by quality metrics.

The null hypothesis ($H_{03}$) is rejected in the case where the quality metric values before refactoring are not equal to the quality metric values after refactoring. The quantification of the hypothesis is necessary for later testing and is presented as follows in terms of p-value:

Null Hypothesis ($H_{03}$): p-value>0.05

Alternate Hypothesis ($H_{13}$): p-value<0.05

Initial individuals are formed from existing security bad smells in the four use case diagrams. The aggregation of the individuals creates the initial population. The population undergoes selection, crossover and mutation operations. Once the algorithm reaches its terminating condition, the algorithm yields a solution carrying best fitness. The selection of the quality metrics and the formation of the rules are accomplished through the measurement of the metrics before and after refactoring.

The corrections in use case diagrams are accomplished by applying relevant refactoring techniques to the identified security bad smells. The mapping of the listed anti-patterns to security bad smells is based on their descriptions and violation of the security aspects. The correction approach uses model transformation using XMI for refactoring purposes. The use case diagrams are exported to XML using Enterprise Architect. The relevant refactoring is applied by modifying/adding/deleting the tags in the XML representation. For example, in the ATM system 400 (FIG. 4), there exists a security bad smell "missing hierarchy", where Bank 401 is accessing the "System Reporting" extension use case. This smell is corrected by removing the association between "Bank" and "System Reporting".

Results

FIG. 8 illustrates the detection rules generated by the exemplary algorithm of FIG. 2.

R1 measures the missing hierarchy security bad smell by using two conditional statements: isExtension and NumAss variables. For example, in FIG. 4, there exists an association between the "System Reporting" extension use case and Bank 401, which is an instance of the missing hierarchy security bad smell.

Similarly, R2 detects the missing modularization security bad smell. This rule also uses two conditional statements with variables: isExtension and extending. For example, in FIG. 4, the "Bad Pin" use case is extending two use cases, which is a clear missing modularization problem.

Finally, R3 detects the broken modularization security bad smell. It uses two conditional statements with variables: isInclusion and included. For example, in FIG. 4, the "System Shutdown" use case is included by a use case.

The set of rules is applied on the use case diagrams to evaluate the recall efficiency. The set of rules governing a best solution is able to identify all 27 security bad smells (UB1-UB27) discussed with respect to the use case diagrams illustrated in FIGS. 4-7, meaning that the detection approach has 100% recall.

A correction approach is able to remove all the security bad smells in the use case diagrams illustrated in FIGS. 4-7. Table 5 to Table 8 summarize the refactoring application to correct the security bad smells in the ATM, human resource, restaurant and travel agency systems of FIGS. 4-7, respectively. The resulting use case diagrams of the ATM, Human Resource, Restaurant and Travel Agency Systems after refactoring are illustrated in FIGS. 9 to 12 respectively. It can be observed from the refactored diagrams that the identified security bad smells have been removed.

Figure 9:
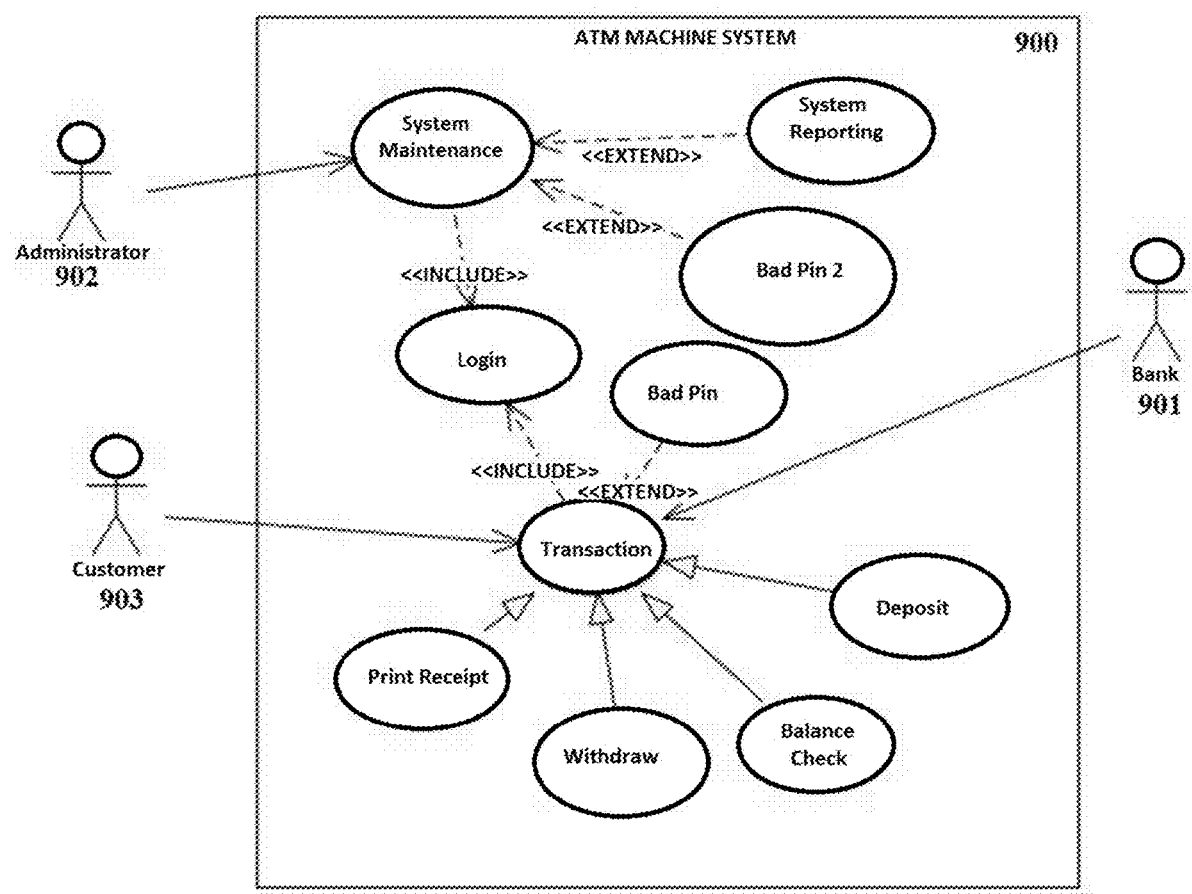
FIG. 9 illustrates a use case diagram of an ATM system after the removal of security bad smells in accordance with this disclosure.

FIG. 9 illustrates a use case diagram of ATM system 900 after the removal of security bad smells in accordance with this disclosure. The three actors are bank 901, administrator 902 and customer 903. As with ATM system 400 in FIG. 4, ATM system 900 offers four types of transactions: deposit, balance check, withdraw and print receipt, all of which have generalization relationships.

Security bad smells UB1-UB3 of ATM system 400 have been removed in ATM system 900, listed in the following Table 5:

TABLE 5

Applied refactoring in ATM system 900

| Security bad smell ID | Applied refactoring |
|---|---|
| UB1 | Drop association between Bank and System Reporting |
| UB2 | Split Bad Pin extension use case into two extension use cases |
| UB3 | Drop System Shutdown inclusion use case |

In particular, security bad smell UB1 no longer exists because Bank 901 is no longer associated with the system reporting action. Security bad smell UB2 no longer exists because the bad pin extension is split into two extension cases—the input of bad pin into a transaction and the input of bad pin 2 into system maintenance. Security bad smell UB3 no longer exists because the system shutdown inclusion use case is dropped.

Figure 10:
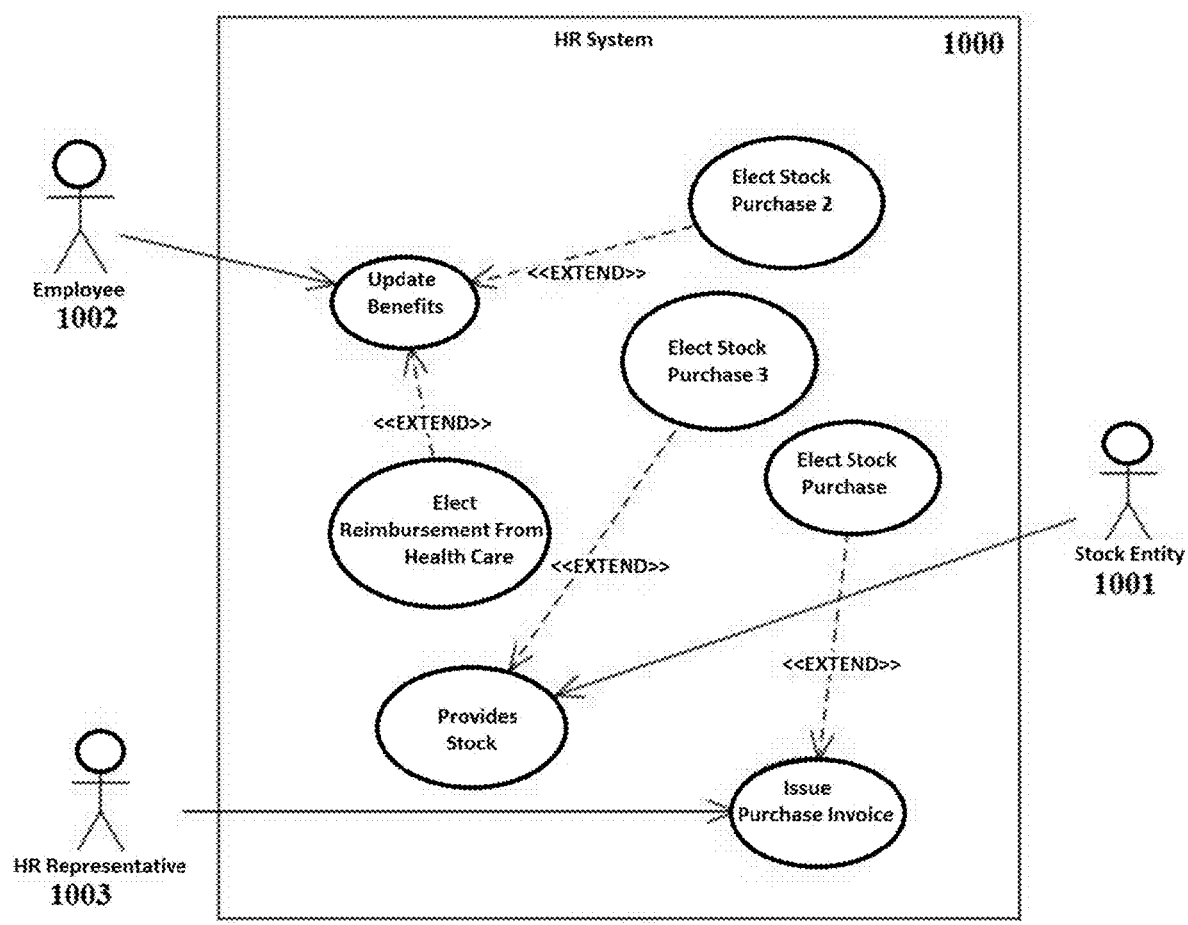
FIG. 10 illustrates a use case diagram of a HR system after the removal of security bad smells in accordance with this disclosure.

FIG. 10 illustrates a use case diagram of HR system 1000 after the removal of security bad smells in accordance with this disclosure.

The actors that interact with HR system 1000 are stock entity 1001, employee 1002 and HR representative 1003. The health care department is removed from interacting with HR system 1000.

Security bad smells UB4-UB9 of HR system 500 have been removed in HR system 1000, listed in the following Table 6:

TABLE 6

Applied refactoring in an HR system 1000

| Security bad smell ID | Applied refactoring |
|---|---|
| UB4 | Drop association between Health Care Dept. and Elect Reimbursement from Health Care Dept. |
| UB5 | Drop association between Stock Entity and Elect Stock Purchase |
| UB6 | Split Elect Stock Purchase extension use case into three extension use cases |
| UB7 | Drop Update Dental Plan inclusion use case |
| UB8 | Drop Update Insurance Plan inclusion use case |
| UB9 | Drop Update Medical Plan inclusion use case |

In particular, security bad smell UB4 no longer exists because the health care department is removed. The health care department may no longer elect reimbursement (UB4). Likewise, association between stock entity 1001 and a stock purchase is removed (UB5). The elect stock purchase extension use case is split into three extension use cases: elect stock purchase, elect stock purchase 2 and elect stock purchase 3 (UB6). Moreover, update dental plane, update insurance plan and medical plan inclusion use cases are removed (UB7-UB9).

Figure 11:
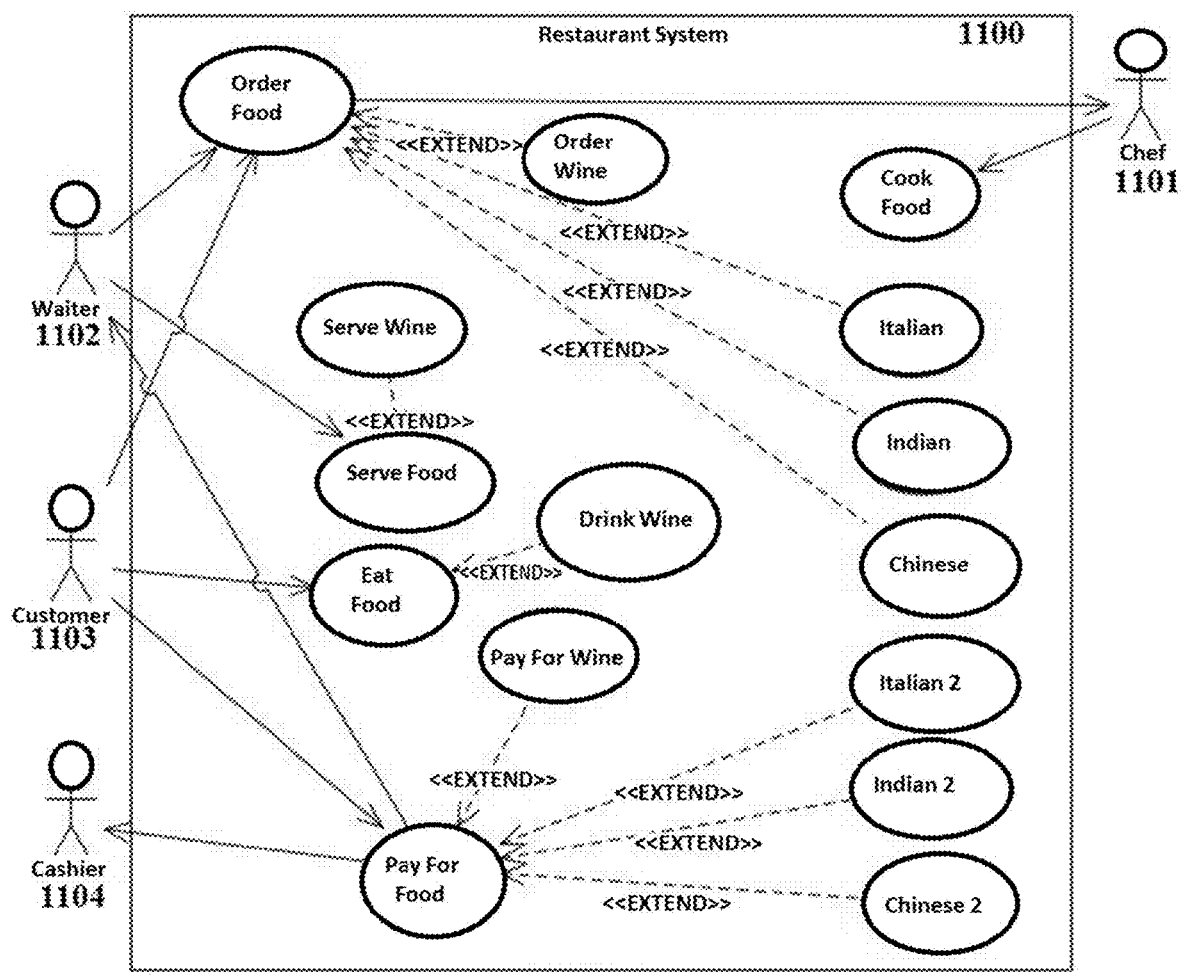
FIG. 11 illustrates a use case diagram of a restaurant system after the removal of security bad smells in accordance with this disclosure.

FIG. 11 illustrates a use case diagram of restaurant system 1100 after the removal of security bad smells in accordance with this disclosure.

The actors that interact with restaurant system 1100 are chef 1101, waiter 1102, customer 1103 and cashier 1104.

Security bad smells UB10-UB20 of restaurant system 600 of FIG. 6 have been removed in restaurant system 1100, listed in the following Table 7:

TABLE 7

Applied refactoring in a restaurant system

| Security bad smell ID | Applied refactoring |
|---|---|
| UB10 | Drop association between Waiter and Order Wine |
| UB11 | Drop association between Customer and Order Wine |
| UB12 | Drop association between Chef and Order Wine |
| UB13 | Drop association between Waiter and Serve Wine |
| UB14 | Drop association between Customer and Drink Wine |
| UB15 | Drop association between Customer and Pay for Wine |
| UB16 | Drop association between Waiter and Pay for Wine |
| UB17 | Split Chinese extension use case into two extension use cases |
| UB18 | Split Italian extension use case into two extension use cases |
| UB19 | Split Indian extension use case into two extension use cases |
| UB20 | Drop Pay Tip inclusion use case |

In particular, associations between waiter, customer and chef and ordering, serving, drinking and paying for wine (UB10-UB16) are dropped. Extension use cases for Chinese, Italian and Indian foods are split into two extension use cases (UB17-UB19). Finally, the pay tip inclusion is removed (UB20).

Figure 12:
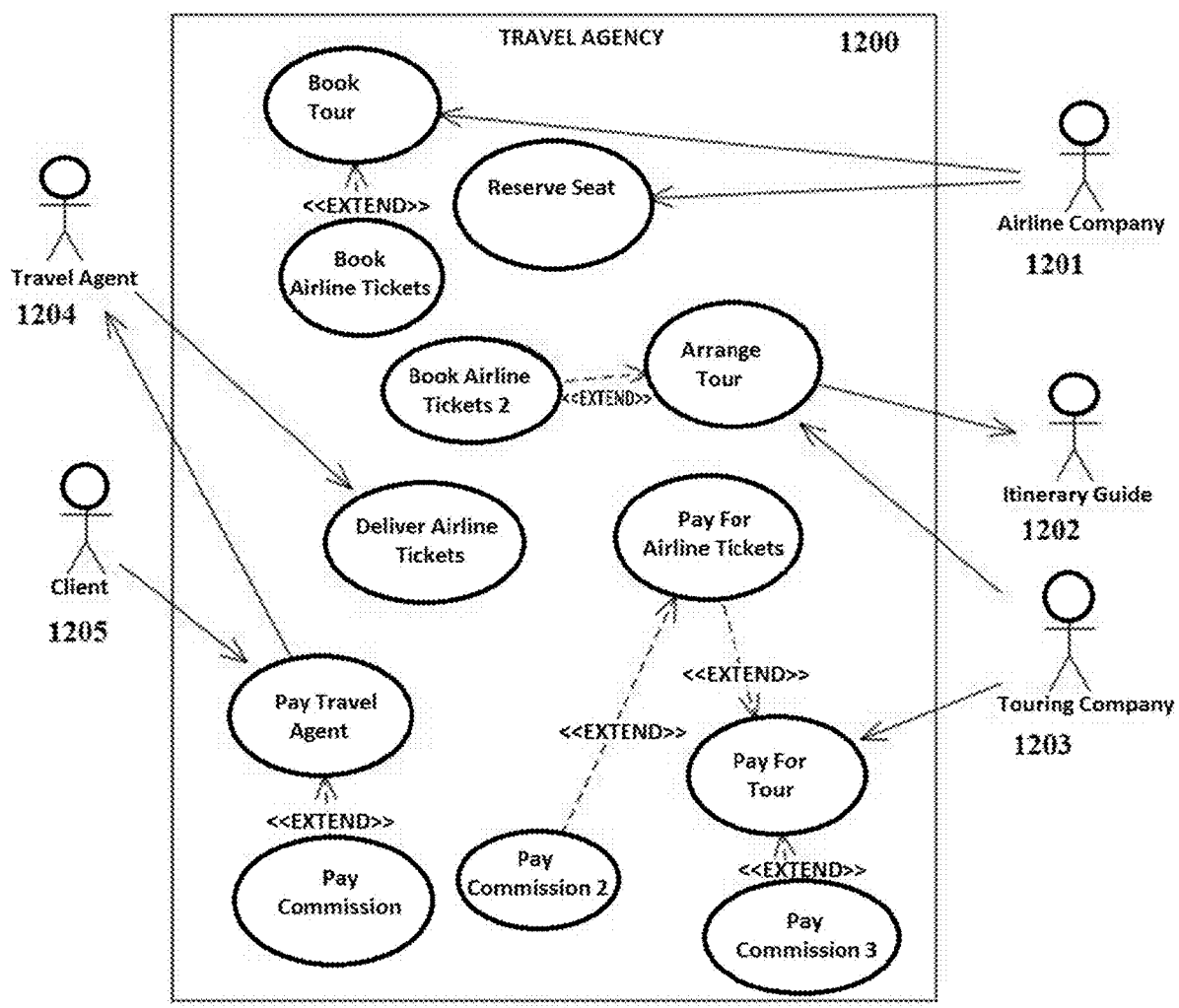
FIG. 12 illustrates a use case diagram of a travel agency system after the removal of security bad smells in accordance with this disclosure.

FIG. 12 illustrates a use case diagram of travel agency system 1200 after the removal of security bad smells in accordance with this disclosure.

The actors that interact with travel agency system 1200 are airline company 1201, itinerary guide 1202, touring company 1203, travel agent 1204 and client 1205.

Security bad smells UB21-UB27 of travel agency system 700 of FIG. 7 have been removed in travel agency system 1200, as listed in the following Table 8:

TABLE 8

Applied refactoring in a travel agency system

| Security bad smell ID | Applied refactoring |
|---|---|
| UB21 | Drop association between Travel Agent and Book Airline Tickets |
| UB22 | Drop association between Airline Company and Book Airline Tickets |
| UB23 | Drop association between Client and Book Airline Tickets |
| UB24 | Drop association between Airline Company and Pay for Airline Tickets |
| UB25 | Split Book Airline Tickets extension use case into two extension use cases |
| UB26 | Split Pay Commission extension use case into three extension use cases |
| UB27 | Drop Pay for Airline Tickets inclusion use case |

In particular, associations between travel agent, airline company and client and book airline tickets and airline company and pay for airline tickets (UB21-UB24) are dropped. Book airline tickets extension use case is split into two separate extension use cases (UB25). Pay commission extension use case is split into three separate extension use cases (UB26). Finally, the pay for airline tickets inclusion use case is dropped (UB27).

Hypotheses Testing

This section discusses the testing of hypotheses.

Hypothesis 1 (EQ1): In order to test hypothesis 1, the Detection Recall (DR) is calculated. The null hypothesis ($H_{O1}$) can be rejected if DR is significant. In numerical terms, if DR is greater than or equal to 80%, the null hypothesis ($H_{O1}$) is rejected. The detection approach shows a significant DR of 100% while being executed on the use case diagrams. The DR is greater than 80%, so null hypothesis ($H_{O1}$) is rejected. This answers EQ1 that the proposed detection approach is able to detect 100% of the security bad smells in use case diagrams.

Hypothesis 2 (EQ2): To test hypothesis 2, the Correction Efficacy (CE) is measured. The null hypothesis ($H_{O2}$) can be rejected if CE is significant. In numerical terms, if CE is greater than or equal to 80%, the null hypothesis ($H_{O2}$) is rejected. The correction approach shows 100% of the security bad smells in the use case diagrams are detected. The CE is greater than 80%, so null hypothesis ($H_{O1}$) is rejected. This addresses EQ2 that the proposed correction approach is able to remove 100% of the security bad smells in use case diagrams.

Hypothesis 3 (EQ3): The pair-wise t-test is used to empirically evaluate the impact of security bad smells in the use case models. The p-value is computed with 95% confidence through a pair-wise t-test. It is observed that the computed p-value is 0.0001, which is less than 0.05. This proves there has been significant security improvement in the use case diagrams and subsequently, answers EQ3. As a result, we reject the null hypothesis ($H_{o3}$) with 95% confidence, hence, the sub-goal of security improvement in use case diagrams is achieved. The quality metric values before and after refactoring are provided in Table B.

TABLE B

Quality Metrics Values before and after Refactoring

| System | Use case | Before refactoring | | | | | After refactoring | | | | |
|---|---|---|---|---|---|---|---|---|---|---|---|
| | | NumAss | Including | Included | Extended | Extending | NumAss | Including | Included | Extended | Extending |
| Travel Agency | Arrange Tour | 2 | 0 | 0 | 1 | 0 | 2 | 0 | 0 | 1 | 0 |
| | Book Airline | 3 | 0 | 0 | 0 | 2 | 0 | 0 | 0 | 0 | 1 |
| | Book Airline | | | | | | 0 | 0 | 0 | 0 | 1 |
| | Book Tour | 1 | 0 | 0 | 1 | 0 | 1 | 0 | 0 | 1 | 0 |
| | Deliver Airline | 1 | 0 | 0 | 0 | 0 | 1 | 0 | 0 | 0 | 0 |
| | Pay | 0 | 0 | 0 | 0 | 3 | 0 | 0 | 0 | 0 | 1 |
| | Pay | | | | | | 0 | 0 | 0 | 0 | 1 |
| | Pay | | | | | | 0 | 0 | 0 | 0 | 1 |
| | Pay for Airline | 1 | 0 | 1 | 1 | 1 | 0 | 0 | 0 | 1 | 1 |
| | Pay Travel | 2 | 1 | 0 | 1 | 0 | 2 | 0 | 0 | 1 | 0 |
| | Pay for Tour | 1 | 0 | 0 | 2 | 0 | 1 | 0 | 0 | 2 | 0 |
| | Reserve Seat | 1 | 0 | 0 | 0 | 0 | 1 | 0 | 0 | 0 | 0 |
| HR System | Elect | 1 | 0 | 0 | 0 | 1 | 0 | 0 | 0 | 0 | 1 |
| | Elect Stock | 1 | 0 | 0 | 0 | 3 | 0 | 0 | 0 | 0 | 1 |
| | Elect Stock | | | | | | 0 | 0 | 0 | 0 | 1 |
| | Elect Stock | | | | | | 0 | 0 | 0 | 0 | 1 |
| | Issue Purchase | 1 | 0 | 0 | 1 | 0 | 1 | 0 | 0 | 1 | 0 |
| | Provide Stock | 1 | 0 | 0 | 1 | 0 | 1 | 0 | 0 | 1 | 0 |
| | Update | 1 | 3 | 0 | 2 | 0 | 1 | 0 | 0 | 2 | 0 |
| | Update Dental | 0 | 0 | 1 | 0 | 0 | | | | | |
| | Update | 0 | 0 | 1 | 0 | 0 | | | | | |
| | Update | 0 | 0 | 1 | 0 | 0 | | | | | |
| Restaurant System | Chinese | 0 | 0 | 0 | 0 | 2 | 0 | 0 | 0 | 0 | 1 |
| | Chinese 2 | | | | | | 0 | 0 | 0 | 0 | 1 |
| | Cook Food | 1 | 0 | 0 | 0 | 0 | 1 | 0 | 0 | 0 | 0 |
| | Drink Wine | 1 | 0 | 0 | 0 | 1 | 0 | 0 | 0 | 0 | 1 |
| | Eat Food | 1 | 0 | 0 | 1 | 0 | 1 | 0 | 0 | 1 | 0 |
| | Indian | 0 | 0 | 0 | 0 | 2 | 0 | 0 | 0 | 0 | 1 |
| | Indian 2 | | | | | | 0 | 0 | 0 | 0 | 1 |
| | Italian | 0 | 0 | 0 | 0 | 2 | 0 | 0 | 0 | 0 | 1 |
| | Italian 2 | | | | | | 0 | 0 | 0 | 0 | 1 |
| | Order Food | 3 | 0 | 0 | 4 | 0 | 3 | 0 | 0 | 4 | 0 |
| | Order Wine | 3 | 0 | 0 | 0 | 1 | 0 | 0 | 0 | 0 | 1 |
| | Pay for Wine | 2 | 0 | 0 | 0 | 1 | 0 | 0 | 0 | 0 | 1 |
| | Pay Tip | 0 | 0 | 1 | 0 | 0 | | | | | |
| | Pay for Food | 3 | 1 | 0 | 4 | 0 | 3 | 0 | 0 | 4 | 0 |

TABLE B-continued

Quality Metrics Values before and after Refactoring

| System | Use case | Before refactoring | | | | | After refactoring | | | | |
|---|---|---|---|---|---|---|---|---|---|---|---|
| | | NumAss | Including | Included | Extended | Extending | NumAss | Including | Included | Extended | Extending |
| | Serve Food | 1 | 0 | 0 | 1 | 0 | 1 | 0 | 0 | 1 | 0 |
| | Serve Wine | 1 | 0 | 0 | 0 | 1 | 0 | 0 | 0 | 0 | 1 |
| ATM | Bad Pin | 0 | 0 | 0 | 0 | 2 | 0 | 0 | 0 | 0 | 1 |
| | Bad Pin 2 | | | | | | 0 | 0 | 0 | 0 | 1 |
| | Balance Check | 0 | 0 | 0 | 0 | 0 | 0 | 0 | 0 | 0 | 0 |
| | Deposit | 0 | 0 | 0 | 0 | 0 | 0 | 0 | 0 | 0 | 0 |
| | Login | 1 | 0 | 2 | 0 | 0 | 1 | 0 | 2 | 0 | 0 |
| | Print Receipt | 0 | 0 | 0 | 0 | 0 | 0 | 0 | 0 | 0 | 0 |
| | System | 1 | 1 | 0 | 2 | 0 | 1 | 2 | 0 | 2 | 0 |
| | System | 1 | 0 | 0 | 0 | 1 | 0 | 0 | 0 | 0 | 1 |
| | System | 0 | 0 | 1 | 0 | 0 | | | | | |
| | Transaction | 1 | 1 | 0 | 1 | 0 | 1 | 1 | 0 | 1 | 0 |
| | Withdraw | 0 | 0 | 0 | 0 | 0 | 0 | 0 | 0 | 0 | 0 |

Supplementary Testing and Observation

The inventors performed additional testing of the detection approach described in this disclosure by utilizing a larger data set. This supplementary testing addresses a notion of result generalization. The larger data set was generated in two ways: 1) simple replication; and 2) varied replication.

Simple Replication Datasets

In simple replication, data is produced by replicating the small datasets. Table 9 shows the statistics of the replicated datasets.

TABLE 9

Statistics of simple replicated datasets

| UML model | Number of use cases | Security bad smell instances |
|---|---|---|
| Use case diagram | 1160 | 638 |

It can be seen that data size is significantly enlarged in terms of the number of use cases and security bad smell instances. Since the data size is increased, the number of security bad smell instances is also increased. The detection rules and DR remain unchanged after performing the experiment with the use case diagrams dataset.

Varied Replication Datasets

Varied replication is used to introduce more quality metric values. The dataset size is increased in terms of the number of use cases, hence the number of security bad smell instances is also increased. Table 10 shows the statistics of the replicated datasets.

TABLE 10

Statistics of replicated datasets with variations

| UML model | Number of use cases | Security bad smell instances |
|---|---|---|
| Use case diagram | 1280 | 704 |

When performing the supplementary testing with varied replication datasets for use case diagrams, the detection rules remain same. Testing with a small dataset, a simple replication dataset and a varied replication dataset produce the same detection rules and DR.

Observation

In the detection approach, the most important element is the examples of security bad smells, as they are used to formulate the rules. Examples of bad smells from online repositories were used, which allow the actual programming practices in the detection process to be identified. The rules generation process is executed multiple times using bad smell examples to reduce any uncertainty with respect to the quality of the rules.

In order to improve the consistency of results, the inventors performed testing, in accordance with the methods of this disclosure, using with large datasets of use case models. Although testing with small datasets give significant results, the testing with the large datasets further strengthen a confidence in the consistency of the results, which can be observed from the achieved detection recall.

The generated solution from multiple runs of algorithm yielded solutions with minimal difference in fitness, which means that the detection approach is stable. During correction, the XMI transformations from the use case models also remain consistent.

During the validation of the security improvement, changes in the quality metric values may be observed. All the quality metrics contribute to the improvement in security in a specific use case model but the impact of the metrics may vary depending on the security bad smell being removed. For instance, the refactoring of missing modularization results in significant changes to the metric values because the extension use case undergoes decomposition. On the other hand, refactoring broken modularization marginally changes the metrics.

Use case models corrected in accordance with the methods and systems of the present disclosure have further shown improvements in quality properties in addition to the security improvements. For example, a notable enhancement in quality is observed in terms of modularity, complexity, reusability and design size. The refactoring of broken modularization in use case diagrams reduces the number of inclusion use cases, which suggests the model is less complex. The refactoring of inclusion use cases also reduces the quantity of use cases per actor, which means that the model size is decreased. The refactoring of missing modularization bad smells introduces modularity in the use case diagrams. The increased modularity in use case diagrams allows reduced complexity and enhanced reusability.

A potential threat to validity that may affect this research may be the selection of the independent variables. However, the inventors have shown through the testing validation that the independent variables, i.e. quality metrics, are selected based on previous studies and after in-depth analysis so as to ensure their effectiveness in measuring the security aspects in use case models. Another construct validity threat is concerned with security bad smell examples. Some security bad smell examples might be overlooked during individual formulation, however, this threat is mitigated by crossover and mutation operations.

The replications of datasets is performed manually so it may cause threats to the conclusion validity. This threat is minimized by making the replication random. Randomization introduces diversity in the datasets, which is the ultimate objective, regardless of the manual replication.

An external threat validity is related to the generalization of the results which is concerned with the selected use case models. However, we used four different use case models from different domains. In addition, we used large datasets to improve the generalization of the results.

Methods and systems in accordance with the present disclosure overcome a problem of security in use case models by applying software refactoring. The detection of security bad smells is achieved through the adaptation of an algorithm approach, and correction is accomplished by a model transformation approach. The detection approach uses quality metrics to formulate rules. The best set of rules generated by the algorithm is used for the detection of security bad smells in the use case models. The correction approach applies a model transformation to XML representation for refactoring the identified security bad smells in use case models.

The inventors further performed testing to validate approaches, in accordance with the methods and systems of the present disclosure, by performing experiments with multiple use case models. The detection approach was able to detect security bad smells with 100% recall. The correction approach was also able to remove 100% of the security bad smells. The inventors further performed supplementary testing to generate more generalized detection rules because the detection approach relies heavily on generated rules. Although the sets of rules generated by the supplementary experiments remain the same, they enhance confidence in the generated rules. Through the statistical analysis of quality metrics, the inventors have demonstrated that there is a significant improvement in the security quality of use case models.

Next, a hardware description of an apparatus in accordance with the present disclosure is described with reference to FIG. 13. In an exemplary implementation, device 1300 performs method 100 illustrated in FIG. 1 and the exemplary algorithm illustrated in FIG. 2. In FIG. 13, the device 1300 includes a CPU 1301 which performs the processes described above/below. The process data and instructions may be stored in memory 1302. These processes and instructions may also be stored on a storage medium disk 1304 such as a hard drive (HDD) or portable storage medium or may be stored remotely. That is, executable instructions to execute method 100 may be stored in a storage medium, transitory or non-transitory, for execution by a device such as device 1300 or other processing circuitry. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device 1300 communicates, such as a server or computer.

Further, the claimed advancements may be provided as a utility application, background daemon, or component of an operating system, or combination thereof, executing in conjunction with CPU 1301 and an operating system such as Microsoft Windows 7, UNIX, Solaris, LINUX, Apple MAC-OS and other systems known to those skilled in the art.

The hardware elements in order to achieve the device 1300 may be realized by various circuitry elements, known to those skilled in the art. For example, CPU 1301 may be a Xenon or Core processor from Intel of America or an Opteron processor from AMD of America, or may be other processor types that would be recognized by one of ordinary skill in the art. Alternatively, the CPU 1301 may be implemented on an FPGA, ASIC, PLD or using discrete logic circuits, as one of ordinary skill in the art would recognize. Further, CPU 1301 may be implemented as multiple processors cooperatively working in parallel to perform the instructions of the inventive processes described above.

The device 1300 in FIG. 13 also includes a network controller 1306, such as an Intel Ethernet PRO network interface card from Intel Corporation of America, for interfacing with network 1313. As can be appreciated, the network 1313 can be a public network, such as the Internet, or a private network such as an LAN or WAN network, or any combination thereof and can also include PSTN or ISDN sub-networks. The network 1313 can also be wired, such as an Ethernet network, or can be wireless such as a cellular network including EDGE, 3G and 4G wireless cellular systems. The wireless network can also be WiFi, Bluetooth, or any other wireless form of communication that is known.

The device 1300 further includes a display controller 1308, such as a NVIDIA GeForce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard.

A sound controller 1320 is also provided in the device 1300, such as Sound Blaster X-Fi Titanium from Creative, to interface with speakers/microphone 1322 thereby providing sounds and/or music.

The general purpose storage controller 1324 connects the storage medium disk 1304 with communication bus 1326, which may be an ISA, EISA, VESA, PCI, or similar, for interconnecting all of the components of the device 1300. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

FIG. 14 shows a schematic diagram of a data processing system 1400, according to certain embodiments, for performing method 100 illustrated in FIG. 1 and the exemplary algorithm illustrated in FIG. 2. The data processing system is an example of a computer in which code or instructions implementing the processes of the illustrative embodiments may be located.

In FIG. 14, data processing system 1400 employs a hub architecture including a north bridge and memory controller hub (NB/MCH) 1425 and a south bridge and input/output (I/O) controller hub (SB/ICH) 1420. The central processing unit (CPU) 1430 is connected to NB/MCH 1425. The NB/MCH 125 also connects to the memory 1445 via a memory bus, and connects to the graphics processor 1450 via an accelerated graphics port (AGP). The NB/MCH 1425 also connects to the SB/ICH 1420 via an internal bus (e.g., a unified media interface or a direct media interface). The CPU Processing unit 1430 may include one or more processors and even may be implemented using one or more heterogeneous processor systems.

For example, FIG. 15 shows one implementation of CPU 1430. In one implementation, the instruction register 1538 retrieves instructions from the fast memory 1540. At least part of these instructions are fetched from the instruction register 1538 by the control logic 1536 and interpreted according to the instruction set architecture of the CPU 1430. Part of the instructions can also be directed to the register 1532. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1534 that loads values from the register 1532 and performs logical and mathematical operations on the loaded values according to the instructions. The results from these operations can be feedback into the register and/or stored in the fast memory 1540. According to certain implementations, the instruction set architecture of the CPU 1430 can use a reduced instruction set architecture, a complex instruction set architecture, a vector processor architecture, a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 1430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 1400 can include that the SB/ICH 1420 is coupled through a system bus to an I/O Bus, a read only memory (ROM) 1456, universal serial bus (USB) port 1464, a flash binary input/output system (BIOS) 1468, and a graphics controller 1458. PCI/PCIe devices can also be coupled to SB/ICH 1420 through a PCI bus 1462.

The PCI devices may include, for example, Ethernet adapters, add-in cards, and PC cards for notebook computers. The Hard disk drive 1460 and CD-ROM 1466 can use, for example, an integrated drive electronics (IDE) or serial advanced technology attachment (SATA) interface. In one implementation the I/O bus can include a super I/O (SIO) device.

Further, the hard disk drive (HDD) 1460 and optical drive 1466 can also be coupled to the SB/ICH 1420 through a system bus. In one implementation, a keyboard 1470, a mouse 1472, a parallel port 1478, and a serial port 1476 can be connected to the system bust through the I/O bus. Other peripherals and devices that can be connected to the SB/ICH 1420 using a mass storage controller such as SATA or PATA, an Ethernet port, an ISA bus, a LPC bridge, SMBus, a DMA controller, and an Audio Codec.

Moreover, the present disclosure is not limited to the specific circuit elements, circuitry or processing circuitry described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the present disclosure may be practiced otherwise than as specifically described herein.

The invention claimed is:

1. A method for improving security of a use case model, the method comprising:
    identifying security bad smells from a database;
    generating, by processing circuitry, a set of detection rules according to the identified security bad smells and quality metrics;
    applying the set of detection rules to the use case model to detect bad smells in the use case model;
    transforming, by the processing circuitry, the use case model into an XML representation;
    generating first quality metrics of the XML representation;
    refactoring, by the processing circuitry using the security bad smells, the XML representation of the use case model to generate a refactored XML representation of the use case model;
    exporting the refactored XML representation back to a refactored use case model;
    performing a behavior consistency verification processing by processing the refactored use case models;
    generating second quality metrics of the refactored XML representation;
    comparing, by the processing circuitry, the first quality metrics with the second quality metrics; and
    generating, by the processing circuitry and based on the comparison of the first quality metrics with the second quality metrics, a quality improvement assessment of security for the use case model.

2. The method according to claim 1, wherein the refactoring further includes correcting the XML representation to remove the security bad smells from the XML representation to generate the refactored XML representation.

3. The method according to claim 1, wherein the detected bad smells are security vulnerabilities in the use case model.

4. The method according to claim 1, wherein the a behavior consistency verification processing is performed with post refactoring conditions.

5. The method according to claim 1, wherein the applying the set of detection rules to the use case model is repeated, to detect additional bad smells in the use case model, prior to the transforming of the use case model.

6. The method according to claim 1, wherein the bad smells include at least one missing hierarchy bad smell.

7. The method according to claim 1, wherein the bad smells include at least one broken modularization bad smell.

8. The method according to claim 1, wherein the bad smells include at least one missing modularization bad smell.

9. The method according to claim 1, wherein the quality improvement assessment represents an increase in security of the refactored use case from the use case model.

10. An apparatus for improving security of a use case model, the apparatus comprising:
processing circuitry configured to:
identify security bad smells from a database;
generate a set of detection rules according to the identified security bad smells and quality metrics;
apply the set of detection rules to the use case model to detect bad smells in the use case model;
transform the use case model into an XML representation;
generate first quality metrics of the XML representation;
refactor, using the security bad smells, the XML representation of the use case model to generate a refactored XML representation of the use case model;
export the refactored XML representation back to a refactored use case model;
perform a behavior consistency verification processing by processing the refactored use case models;
generate second quality metrics of the refactored XML representation;
compare the first quality metrics with the second quality metrics; and
generate, based on the comparison of the first quality metrics with the second quality metrics, a quality improvement assessment of security for the use case model.

11. The apparatus according to claim 10, wherein to refactor the XML representation, the processing circuitry is further configured to correct the XML representation to remove the security bad smells from the XML representation to generate the refactored XML representation.

12. The apparatus according to claim 10, wherein the detected bad smells are security vulnerabilities in the use case model.

13. The apparatus according to claim 10, wherein the behavior consistency verification processing is performed with post refactoring conditions.

14. The apparatus according to claim 10, wherein the processing circuitry repeats the application of the set of detection rules to the use case model to detect additional bad smells in the use case model, prior to the transforming of the use case model.

15. The apparatus according to claim 10, wherein the bad smells include at least one missing hierarchy bad smell.

16. The apparatus according to claim 10, wherein the bad smells include at least one broken modularization bad smell.

17. The apparatus according to claim 10, wherein the bad smells include at least one missing modularization bad smell.

18. The apparatus according to claim 10, wherein the quality improvement assessment represents an increase in security of the refactored use case from the use case model.

19. A non-transitory computer readable medium storing computer executable instructions which, when executed by a computer, cause the computer to:
identify security bad smells from a database;
generate a set of detection rules according to the identified security bad smells and quality metrics;
apply the set of detection rules to a use case model to detect bad smells in the use case model;
transform the use case model into an XML representation;
generate first quality metrics of the XML representation;
refactor, using the security bad smells, the XML representation of the use case model to generate a refactored XML representation of the use case model;
export the refactored XML representation back to a refactored use case model;
perform a behavior consistency verification processing by processing the refactored use case models;
generate second quality metrics of the refactored XML representation;
compare the first quality metrics with the second quality metrics; and
generate, based on the comparison of the first quality metrics with the second quality metrics, a quality improvement assessment of security for the use case model.

20. The non-transitory computer readable medium according to claim 19, wherein to refactor the XML representation, the computer is further caused to correct the XML representation to remove the security bad smells from the XML representation to generate the refactored XML representation.

* * * * *